(12) United States Patent
Condrey

(10) Patent No.: US 8,235,132 B2
(45) Date of Patent: Aug. 7, 2012

(54) SINGLE PASS PLOW

(75) Inventor: Tommy H. Condrey, Lake Providence, LA (US)

(73) Assignee: Mod-Track Corporation, Lake Providence, LA (US)

(*) Notice: Subject to any disclaimer, the term of this patent is extended or adjusted under 35 U.S.C. 154(b) by 127 days.

(21) Appl. No.: 11/588,664

(22) Filed: Oct. 26, 2006

(65) Prior Publication Data

US 2007/0089888 A1 Apr. 26, 2007

Related U.S. Application Data

(60) Provisional application No. 60/730,311, filed on Oct. 26, 2005.

(51) Int. Cl.
*A01B 5/00* (2006.01)

(52) U.S. Cl. .................................. 172/177; 172/179

(58) Field of Classification Search .................. 172/133, 172/175, 176, 177, 179, 180
See application file for complete search history.

(56) References Cited

U.S. PATENT DOCUMENTS

| | | | |
|---|---|---|---|
| 57,185 A * | 8/1866 | Price | 172/177 |
| 89,983 A * | 5/1869 | Gould | 172/147 |
| 137,894 A * | 4/1873 | Cotten | 172/700 |
| 639,697 A * | 12/1899 | Schwartz | 172/471 |
| 841,315 A * | 1/1907 | Everett | 172/176 |
| 1,297,182 A * | 3/1919 | King | 172/552 |
| 1,525,262 A | 12/1921 | Austin | |
| 2,200,631 A | 3/1939 | Merlich | |
| 2,973,044 A | 10/1957 | Meredith | |
| 2,949,968 A * | 8/1960 | Stoner | 172/166 |
| 3,151,683 A * | 10/1964 | Steck | 172/148 |
| 3,170,421 A * | 2/1965 | Norris et al. | 111/148 |
| 3,692,120 A * | 9/1972 | Cline | 172/151 |
| 3,714,992 A * | 2/1973 | Meier | 172/175 |
| 3,935,906 A * | 2/1976 | Neal et al. | 172/177 |
| 4,024,921 A * | 5/1977 | Tibbs, II | 172/146 |
| 4,088,083 A | 5/1978 | Dail, Jr. et al. | |
| 4,095,653 A * | 6/1978 | van der Lely | 172/177 |
| 4,213,408 A | 7/1980 | West et al. | |
| 4,231,305 A * | 11/1980 | van der Lely | 111/119 |
| 4,267,783 A * | 5/1981 | Hendrix et al. | 111/148 |
| 4,280,564 A | 7/1981 | van der Lely | |
| 4,315,547 A * | 2/1982 | Rau et al. | 172/1 |

(Continued)

FOREIGN PATENT DOCUMENTS

EP  0074778  3/1983

(Continued)

*Primary Examiner* — Thomas B Will
*Assistant Examiner* — Joel F. Mitchell
(74) *Attorney, Agent, or Firm* — Sutherland Asbill & Brennan LLP

(57) ABSTRACT

Plows and methods of fabricating plows are provided. The plow includes an elongated frame. One or more shear assemblies are affixed to the frame in a spaced relationship along a length of the frame, wherein each of the one or more shear assemblies includes a shearing blade disposed at a distal end of the shear assembly and configured to operate below the surface of the soil to sever the roots of planted vegetation as the plow is pulled through a field. One or more cylinder assemblies are rotatably affixed to the frame and positioned parallel to the one or more shear assemblies and configured to rotate as the plow is pulled through a field. The one or more cylinder assemblies include a plurality of radially extending cylinder blades configured to mulch the soil and press the severed vegetation into the soil.

20 Claims, 10 Drawing Sheets

U.S. PATENT DOCUMENTS

| | | | |
|---|---|---|---|
| 4,331,204 A | 5/1982 | White | |
| 4,361,191 A * | 11/1982 | Landoll et al. | 172/146 |
| 4,446,924 A * | 5/1984 | Dietrich, Sr. | 172/140 |
| 4,508,177 A * | 4/1985 | Wiser | 172/177 |
| 4,601,248 A | 7/1986 | Beasley | |
| 4,762,181 A | 8/1988 | Cox | |
| 4,865,132 A | 9/1989 | Moore, Jr. | |
| 4,909,335 A * | 3/1990 | Walt, Jr. | 172/166 |
| 5,285,854 A | 2/1994 | Thacker et al. | |
| 5,390,745 A * | 2/1995 | Harden | 172/175 |
| 5,474,135 A * | 12/1995 | Schlagel | 172/151 |
| 5,524,711 A * | 6/1996 | Harris | 172/67 |
| 5,797,460 A * | 8/1998 | Parker et al. | 172/151 |
| 6,494,270 B1 | 12/2002 | Lawson | |
| 6,554,078 B1 | 4/2003 | McDonald | |
| 6,557,646 B1 | 5/2003 | Hurtis et al. | |
| 6,578,640 B1 | 6/2003 | Ohlman et al. | |
| 6,612,378 B2 | 9/2003 | Sauder | |
| 6,681,868 B2 * | 1/2004 | Kovach et al. | 172/701 |
| 2003/0037935 A1 | 2/2003 | Sauder | |

FOREIGN PATENT DOCUMENTS

FR  2597291  4/1987

* cited by examiner

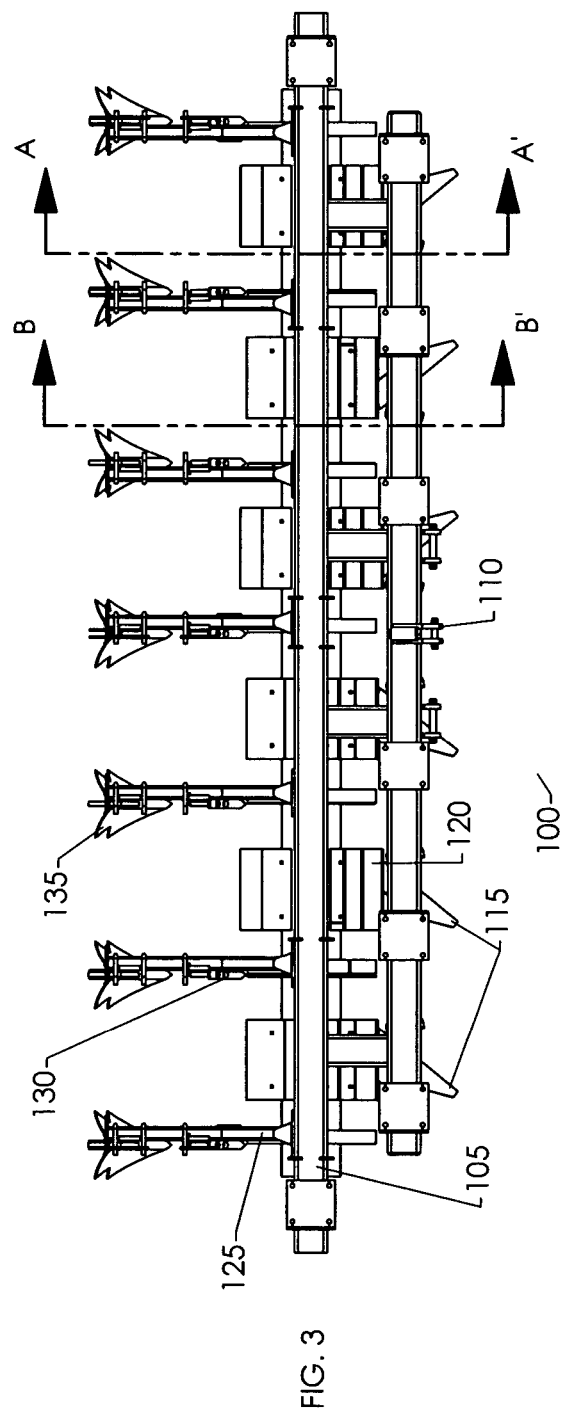
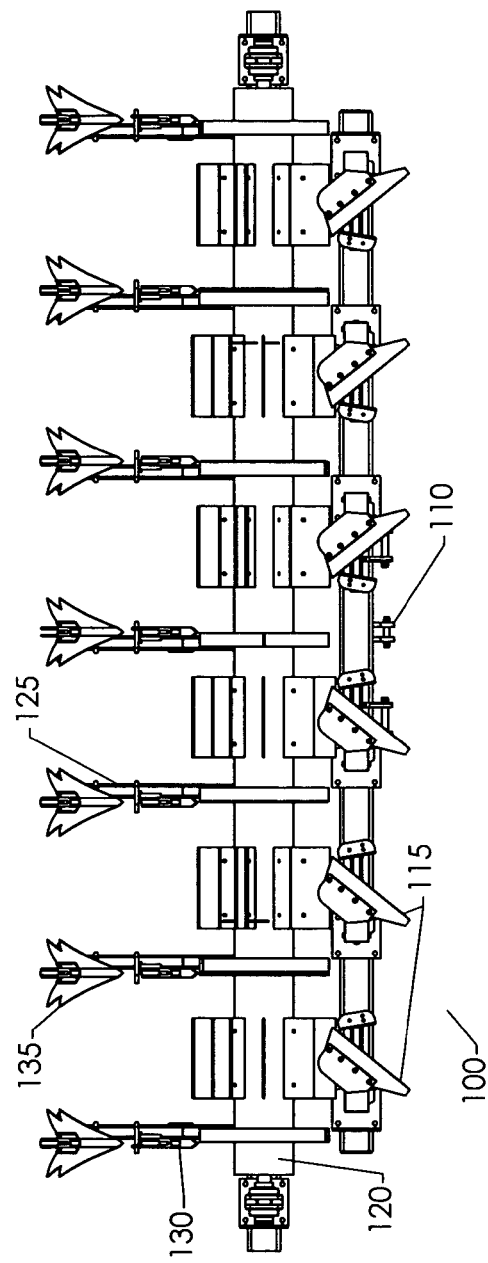
FIG. 3
FIG. 4

SINGLE PASS PLOW

RELATED APPLICATIONS

This application claims priority from U.S. Provisional Application No. 60/730,311, entitled "Single Pass Plow," filed on Oct. 26, 2005, which is incorporated herein by reference in its entirety.

FIELD OF THE INVENTION

The present invention relates generally to plows for preparing the ground for planting crops.

BACKGROUND OF THE INVENTION

Many different types of equipment and methods have been used to prepare agricultural ground for planting. Typically, after a crop has been harvested, the agricultural ground must be prepared for planting the next crop. Several methods for preparing the agricultural ground have been widely used. The first is a no-tillage system, wherein no work is done to the ground prior to planting a crop after a previous crop has been harvested. No tillage systems, however, generally do not adequately prepare the agricultural ground for planting the next crop, which leads to lower crop yields.

Another method for preparing agricultural ground is a multi-pass system. In a typical multi-pass system, the vegetation left from the previous crop is typically cut and removed during a first pass over the agricultural ground by a tractor pulling a cutting device. Then, a second pass is typically made in which a tractor must pull a ground breaking device over the agricultural ground. Then, a third pass is typically made in which a tractor must pull a plow across the agricultural ground that reforms planting rows prior to planting the next crop. Therefore, at a minimum, a multi-pass system typically requires at least three passes by a tractor over the agricultural ground in order to adequately prepare the agricultural ground for the next crop. Accordingly, multi-pass systems are time consuming and expensive because a tremendous amount of effort and fuel is needed to perform the multiple passes over the agricultural ground. Additionally, the profits available from a crop are reduced due to the need to make multiple passes over the agricultural ground.

Therefore, there exist a need in the art for an improved system and device for preparing agricultural ground for planting a crop.

SUMMARY OF THE INVENTION

Disclosed is a plow and method of fabricating a plow. The plow includes an elongated frame with one or more shear assemblies affixed to the frame in a spaced relationship along a length of the frame. Each of the one or more shear assemblies includes a shearing blade disposed at a distal end of the shear assembly and configured to operate below the surface of the soil to sever the roots of planted vegetation as the plow is pulled through a field. The vertical position of the shearing blade may be adjustable. One or more cylinder assemblies are rotatably affixed to the frame and positioned parallel to the one or more shear assemblies and configured to rotate as the plow is pulled through a field. The one or more cylinder assemblies include a plurality of radially extending cylinder blades configured to mulch the soil and press the severed vegetation into the soil. The one or more cylinder assemblies may further include a first and second cylinder support arm extending from the frame, and a cylinder body rotatably attached to the first and second cylinder support arms. One or more gauge wheels may be configured in a spaced relationship along the cylinder body to control the vertical position of the plow as the plow is being pulled through a field. One or more coulters may additionally be mounted to the cylinder body and configured in a spaced relationship along the cylinder assembly.

According to an aspect of the present invention, one or more support arms extend from the frame, wherein each of the one or more support arms is configured to hold one or more ground working implements. The one or more ground working implements are laterally adjustable along the length of at least one of the one or more support arms. The one or more ground working implements are also vertically adjustable in their attachment to at least one of the one or more support arms. One of the ground working implements may be a rowing device configured to reposition soil on top of the severed vegetation and form a seedbed. Another one of the ground working implements may be a chisel assembly configured to break the ground between two adjacent rows of planted vegetation. A hitch may also be affixed to the frame and configured to allow the plow to be lifted and transported by a prime mover.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a top plan view of a single pass plow according to a first illustrative embodiment of the present invention.

FIG. 4 is a bottom plan view of a single pass plow according to a first illustrative embodiment of the present invention.

FIG. 9A is a top plan view of a shear assembly of a single pass plow according to an illustrative embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
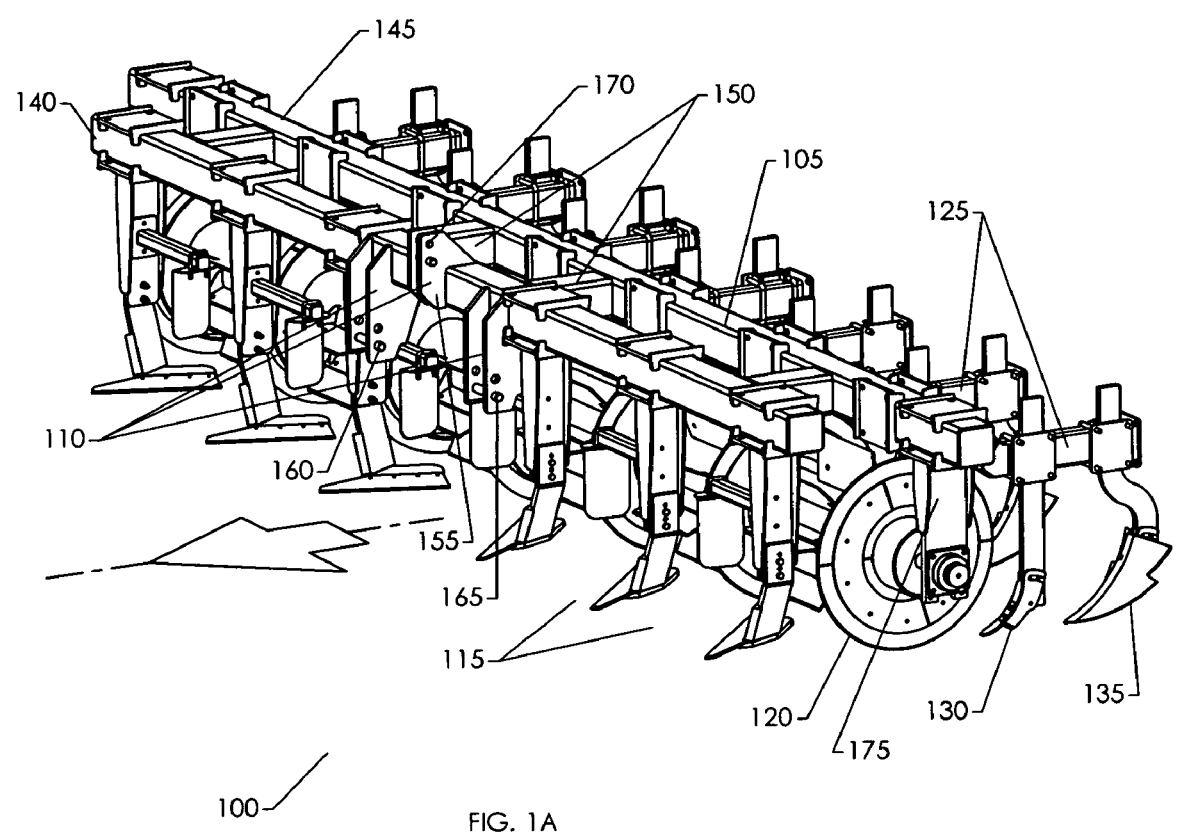
FIG. 1A is a front perspective view of a single pass plow according to a first illustrative embodiment of the present invention.

FIG. 1A is a front perspective view of a single pass plow 100 according to a first illustrative embodiment of the present invention. The single pass plow 100 may include a tool bar 105, a hitch 110, one or more shear assemblies 115, a cylinder assembly 120, and one or more support arms 125. Additionally, a chisel assembly 130 and/or a rowing device 135 may be attached to each of the support arms 125.

The tool bar 105 of the single pass plow 100 may function as a frame and other components of the single pass plow 100 may be connected or mounted to the tool bar 105. As shown in FIG. 1A, the tool bar 105 may include a first cross bar 140 and a second cross bar 145. The two cross bars 140, 145 may be connected to one another by one or more braces 150. The cross bars 140, 145 may be permanently affixed or connected to the braces 150 such as, for example, by welding the cross bars 140, 145 to the one or more braces 150. Alternatively, the cross bars 140, 145 may be removably connected to the one or more braces 150 via any suitable connecting device such as, for example, bolts, screws, pegs, or pins. The cross bars 140, 145 and the one or more braces 150 may be constructed out of tubular steel or any other suitable materials including, but not limited to, iron, plastic, aluminum, synthetic fibers, polymers, steel or other metal alloys, solid steel, other metals, ceramics or a combination of materials.

It will be understood by those of skill in the art that the tool bar 105 may include any number of cross bars and braces to connect the cross bars. Additionally, it will be understood that the cross bars and braces may be individual components that are connected together to form the tool bar 105, or alternatively, the tool bar 105 may be a formed of a single or unitary component.

In the exemplary embodiments of the single pass plow 100, the one or more shear assemblies 115 may be connected to the first cross bar 140 and the cylinder assembly 120 may be connected to the second cross bar 145. The separation between the first cross bar 140 and the second cross bar 145 and, accordingly, the length of the one or more braces 150 may be determined by the size of the one or more shear assemblies 115, the size of the cylinder assembly 120, and/or the desired separation between the one or more shear assemblies 115 and the cylinder assembly 120, as explained in greater detail below with reference to FIG. 10. It will, however, be understood that many different lengths may be used for the one or more braces 150 to allow for various separations between the first cross bar 140 and the second cross bar 145. Additionally, it will be understood that adjustable braces or multi-section braces may be utilized in accordance with the present invention to allow the separation between the first and second cross bars 140, 145 to be varied.

The length of the first cross bar 140 and the second cross bar 145 may be determined at least in part by the intended number of agricultural crop rows that are to be worked by the single pass plow 100. The single pass plow 100 depicted in FIG. 1A is a six row embodiment of the single pass plow 100. The cross bars 140, 145 of the tool bar 105 may be sized accordingly to support enough shear assemblies 115 to work six agricultural rows and a cylinder assembly 120 that has a sufficient length for working six agricultural rows, as explained in greater detail below. However, it will be understood that many different lengths for the first and second crossbars 140, 145 may be utilized for a plow in accordance with the present invention. Additionally, the lengths of the first and second crossbars 140, 145 do not necessarily have to be the same, as shown in FIG. 1A where the second cross bar 145 is longer than the first cross bar 140. It will also be understood that the lengths of the cross bars 140, 145 may be adjustable or that a cross bar 140, 145 may be formed of more than one section, allowing various cross bar lengths to be achieved.

A hitch 110 may be connected to or incorporated into the tool bar 105 of the single pass plow 100. The hitch 110 may allow the single pass plow 100 to be pulled by a prime mover such as, for example, a tractor. The hitch 110 may be any type of hitch suitable for allowing the single pass plow 100 to be pulled by a prime mover such as, for example, a standard three point hitch as will be understood by those of ordinary skill in the art. It will also be understood that the single pass plow 100 of the present invention may be pushed and/or integrated into a vehicle rather than being configured to be pulled by a prime mover. For a standard three point hitch, three attaching points 155, 160, 165 may be included in the hitch 110. A central attaching point 155 may be adapted to connect to a movable center arm or top link of a tractor. The central attaching point 155 may be positioned between two outer hitching points 160, 165 and may further be vertically positioned above the two outer hitching points 160, 165. The two outer hitching points 160, 165 may be adapted to each connect to an outer arm or hitch lifting arm of a tractor. The hitch lifting arms may further be controlled by the hydraulic system of the tractor and used to lift, lower, or tilt the one pass plow 100 as it is being pulled by the tractor.

Each of the attaching points 155, 160, 165 of the hitch 110 may include one or more sets of attachment holes 170. The one or more sets of attachment holes 170 may be used to connect an arm of a prime mover to the hitch 110 such as, for example, a center arm or lifting arm of a tractor. The one or more sets of attachment holes 170 may be vertically spaced along an attaching point 155, 160, 165 to allow the arm of the prime mover to be connected at various vertical positions of the attaching point 155, 160, 165. A connection hole located on the arm of the prime mover may be situated between a set of attachment holes 170 and connected to the hitch 110 by inserting a peg, post, bolt, or other suitable device through both the arm and a corresponding set of attachment holes 170. The peg, post, bolt, or other suitable device may then be secured in place with a locking mechanism such as, for example, a pin or a nut. Although only two sets of attachment holes 170 are shown in FIG. 1A for each attaching point 155, 160, 165, it will be understood that any number of sets of attachment holes 170 may be situated on each attaching point 155, 160, 165. Additionally, the sets of attachment holes 170 may be vertically or horizontally spaced along each attaching point 155, 160, 165.

As shown in FIG. 1A, one or more support arms 125 may also be connected to the tool bar 105. Ground working implements in addition to the one or more shears 115 and the cylinder assembly 120 may be attached or connected to the one or more support arms 125. FIG. 1A shows a chisel assembly 130 and a rowing device 135 connected to each support arm 125; however, it will be understood by those of skill in the art that many other types of ground working implements may be connected to one or more of the support arms 125 including, but not limited to, disk harrows, moldboard plows, chisel plows, subsoilers, bedders, ridgers, cultivators, harrows, rotary hoes, seadbed conditioners, roller harrows, packers, rotary tillers, Burrowers, and basket rollers. It will also be understood that ground working implements may be connected directly to the tool bar 105 in addition to and/or as an alternative to connecting ground working implements to the one or more extension arms 125.

The one or more support arms 125 may be permanently or removably connected to the second cross bar 145 of the tool bar 105 and may further extend rearwardly from the second cross bar 145. The one or more support arms 125 may be removably connected to the second cross bar 145 by any suitable means such as, for example, bolts, screws, pins, welds, or any combination of attachment means. By removably connecting the support arms 125 to the second cross bar 145, the support arms 125 may be laterally adjustable along the length of the second cross bar 145.

Each of the one or more support arms 125 may extend rearwardly from the tool bar 105 of the single pass plow 100. Additionally, at least a portion of each support arm 125 may angle downwardly from the tool bar 105, as explained in greater detail below with reference to FIGS. 7 and 8. By angling a portion of each support arm 125 downwardly from the tool bar 105, ground working implements may be connected to each support arm 125 at a lower vertical position than the vertical position of the tool bar 105. Accordingly, the length required for any shanks incorporated into or connecting to the ground working implements may be less than the length that would be required if the support arms 125 did not include an angled portion. Utilizing shorter shafts in conjunction with the ground working implements may provide greater strength and leverage to the shafts and the ground working implements. For example, if a chisel assembly 130 is connected to a support arm 125 that contains an angled portion, the length of a chisel shaft that connects a chisel to the support arm 125 may be reduced. The shorter chisel shaft may then provide greater strength and leverage to the chisel assembly 130 as the single pass plow 100 is pulled through agricultural ground.

It will be understood that, in addition to the second cross bar 145 of the tool bar 105, one or more additional cross bars or braces may extend between two or more of the support arms 125. For example, a cross bar may extend between all of the support arms 125 at their distal ends relative to the tool bar 105. It will also be understood that ground working implements may be connected or attached to the one or more additional cross bars or braces. Additionally, the one or more support arms 125 may be constructed out of tubular steel or out of any other suitable materials including, but not limited to, iron, plastic, aluminum, synthetic fibers, polymers, steel or other metal alloys, solid steel, other metals, ceramics or a combination of materials.

Figure 1B:
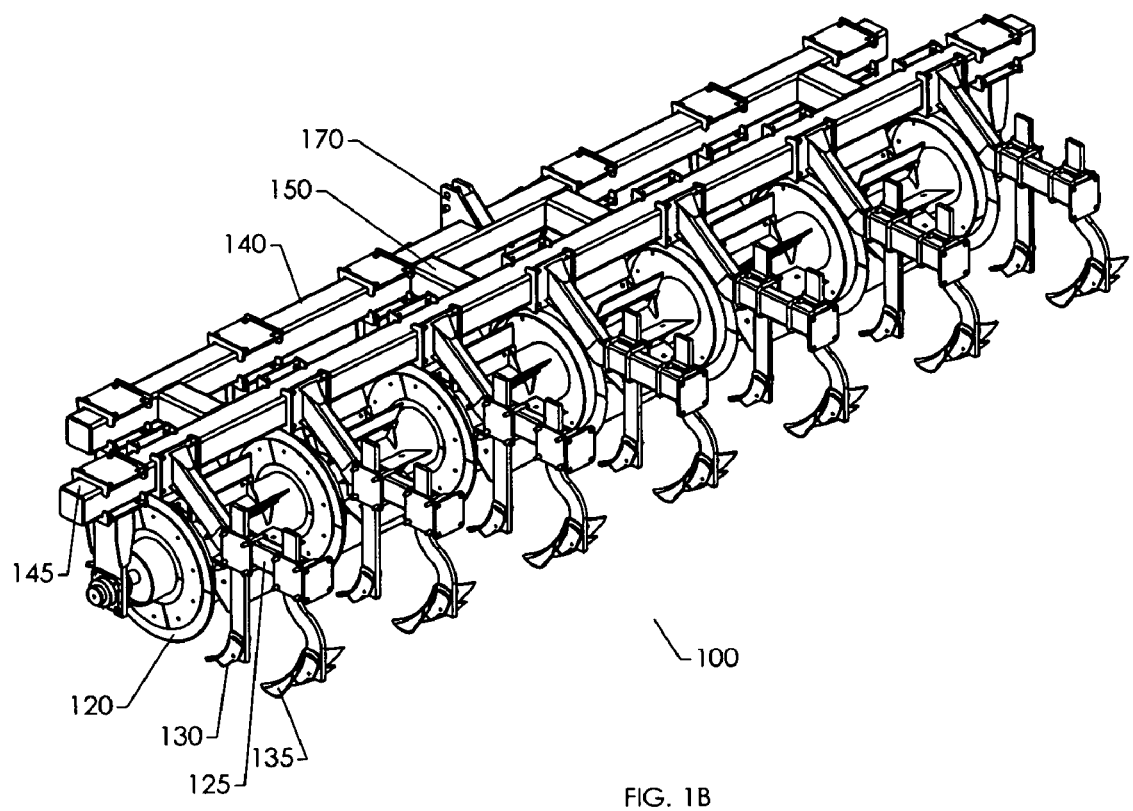
FIG. 1B is a rear perspective view of a single pass plow according to a first illustrative embodiment of the present invention.

FIG. 1B is a rear perspective view of a single pass plow 100 according to a first illustrative embodiment of the present invention. Similar to FIG. 1A, a six row embodiment of a single pass plow 100 is shown in FIG. 1B.

Figure 2:
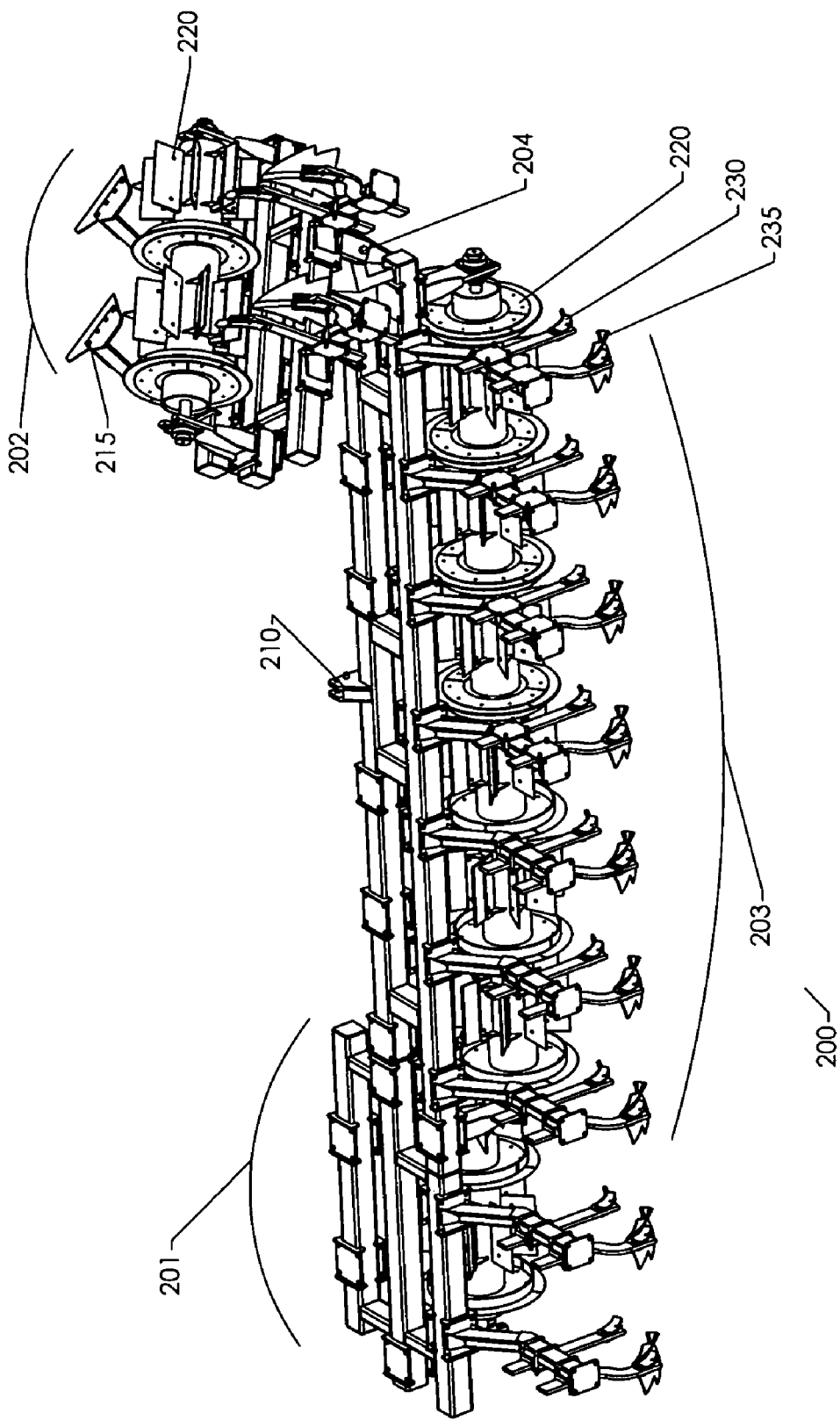
FIG. 2 is a perspective view of a single pass plow according to a second illustrative embodiment of the present invention.

FIG. 2 is a perspective view of a single pass plow 200 according to a second illustrative embodiment of the present invention. A ten row embodiment of a single pass plow 200 is shown in FIG. 2. According to an aspect of the present invention, the single pass plow 200 may include one or more lateral sections, and each of the one or more lateral sections may be utilized to work different rows of agricultural land while the single pass plow 200 is pulled through a field. Three lateral sections 201, 202, 203 are shown in FIG. 2; however, it will be understood by those of skill in the art that the single pass plow 200 may include any number of lateral sections. The three lateral sections 205, 210, 215 may each include a separate tool bar 205 or, alternatively, one or more of the three lateral sections 201, 202, 203 may share a tool bar 205. Additionally, it will be understood that each of the one or more lateral sections of the single pass plow 200 may include separate ground working implements. For example, each of the three lateral sections 201, 202, 203 shown in FIG. 2 may include a separate cylinder assembly 220.

Also shown in FIG. 2, one or more outside sections 201, 202 of the single pass plow 200 may be situated in a forward position relative to a central section 203 of the single pass plow 200. The central section 203 of the single pass plow 200 may include a hitch 210, one or more shear assemblies 215, a cylinder assembly 220, and one or more support arms 225 to which additional ground working implements may be attached. Each of the outside sections 201, 202 of the single pass plow 200 may include one or more shear assemblies 215, a cylinder assembly 220, and one or more support arms 225 to which additional ground working implements may be attached. The central section 203 may be utilized to work six rows of crops and each of the outside sections 201, 202 may be utilized to work two rows of crops; however, it will be understood that any number of rows of crops may be worked by each of the sections 201, 202, 203 of the single pass plow. For example, in a twelve row embodiment of the single pass plow 200, the central section 203 may be utilized to work four rows of crops and each of the outside sections 201, 202 may be utilized to work four rows of crops.

The outside sections 201, 202 of the single pass plow 200 may be situated in a forward position relative to the central section 200 to assist in the lifting of the single pass plow 200 by a prime mover. The center of mass of the single pass plow 200 may be altered by positioning the outside sections 201, 202 in a forward position relative to the central section 203 and, consequently, the weight at the hitch 210 of the single pass plow 200 may be reduced. As a result, the power needed to lift the single pass plow 200 may be reduced, thereby aiding a prime mover such as, for example, a tractor, in lifting and transporting the single pass plow 200.

It will be understood that additional features may be incorporated into the single pass plow 200 to assist a prime mover in transporting the single pass plow 200. For example, one or more of the outside sections 201, 202 of the single pass plow 200 may be connected to the central section 203 by one or more hinges 204, thereby allowing one or more of the outside sections 201, 202 to be hinged into an upward or vertical position. For wider embodiments of the single pass plow 200 such as, for example, a twelve row or a fourteen row embodiment of the single pass plow 200, hinging one or more of the outside sections 201, 202 into an upward position may reduce the overall width of the single pass plow 200. Accordingly, the single pass plow 200 may be more easily transported in certain situations such as, for example, when transporting the single pass plow 200 down a road in order to reach agricultural land.

Another feature that may be incorporated into or utilized in conjunction with the single pass plow 200 to assist in transporting the single plow 200 is a lift assist assembly, as will be understood by those of skill in the art. The lift assist assembly may include one or more hydraulically operated rubber gauge wheels that may assist in lifting the single pass plow 200 when it is transported. It will also be understood that any number of wheels may be incorporated into the single pass plow 200 to assist in transporting the single pass plow 200. For example, wheels may be attached to wheel supports or wheel mounts that extend downwardly from the tool bar 205 of the single pass plow 200, and the wheels may support all of or a portion of the weight of the single pass plow 200 when it is being transported to or from agricultural ground. Additionally, the wheel supports may be removably attached or hingably attached to the tool bar 205, thereby allowing the wheel supports and attached wheels to be removed or hinged into an upward position when the plow is being pulled across agricultural land by a prime mover.

FIG. 3 is a top view of a single pass plow 100 according to a first illustrative embodiment of the present invention. Similarly, FIG. 4 is a bottom view of a single pass plow 100 according to a first illustrative embodiment of the present invention. A six row embodiment of the single pass plow 100 is illustrated in FIGS. 3-4. As shown in FIGS. 3-4, the one or more support arms 125 may be laterally positioned in the spaces to the side of and/or between the one or more shear assemblies 115. In operation, as the single pass plow 100 is pulled across agriculture land, the one or more shear assemblies 115 may operate on the rows of crops, as explained in greater detail below with reference to FIGS. 7-9. The blades of the cylinder assembly 120 may also operate on the rows of crops, as explained in greater detail below with reference to FIGS. 7, 8, and 10. Additionally, the one or more support arms 125 may be positioned between the rows of crops, and the ground working implements attached to the one or more support arms 125 may operate on or work the ground between the rows of crops, as explained in greater detail below with reference to FIGS. 7, 8, 11, 12, and 14.

It will be understood that the single pass plow 100 may be utilized to work agricultural land according to many different row spacings. For example, the single pass plow 100 may be utilized to work agricultural land that contains row to row spacings of approximately ten to approximately fifty inches. According to a particularly beneficial embodiment of the present invention, the single pass plow 100 may be utilized to work agricultural land with a row to row spacing of approximately thirty-six to forty inches. It will be understood that the row to row spacing of agricultural land may be measured from the center of one row of crops to the center of an adjacent row of crops. The seed bed area or the width of the seed bed of each row of crops may vary depending on the type of crop planted. The seed bed area of many types of agricultural crops such as, for example, corn, cotton and soy beans, may be approximately eighteen inches or less; however, it will be understood that in some situations, the seed bed area may exceed approximately eighteen inches.

As explained in greater detail below, each of the one or more shear assemblies 115 of the single pass plow 100 may operate within the seed bed area of a row of crops or within the area immediately surrounding the seed bed area of a row of crops. Similarly, the blades 1025 (FIG. 10) of the cylinder assembly 120 may operate within the seed bed area of a row of crops or within the area immediately surrounding the seed bed area of a row of crops. The one or more support arms 125 of the single pass plow 100 may be laterally positioned between the seed bed areas of two adjacent rows of crops, and the ground working implements attached to or connected to the one or more support arms 125 may operate on the agricultural ground situated between the seed bed areas of two adjacent rows of crops. It will, however, be understood that the ground working implements attached to or connected to the one or more support arms 125 may be intended to operate within the seed bed area of a row of crops or, alternatively, may incidentally operate within the seed bed area of a row of crops.

Also shown in FIGS. 3-4, the one or more shear assemblies 115 of the single pass plow 100 may be configured so that the cutting edge 930 of the blade portion 910 (FIGS. 9A-9E) of each shear assembly 115 is angled toward the hitch 110 of the single pass plow 100. Accordingly, the one or more shear assemblies 115 situated on either side of the hitch 110 may form a mirror image of one another. As explained in greater detail below, such a configuration of the one or more shear assemblies 115 may assist in preventing the one or more shear assemblies 115 from contacting or interfering with the hitch 110 of the single pass plow 100. It will, however, be understood by those of skill in the art that the cutting edge 930 of the blade portion 910 of each of the one or more shear assemblies 115 may be configured so that it is angled toward the hitch 110 or away from the hitch 110 of the single pass plow 100.

Figure 5:
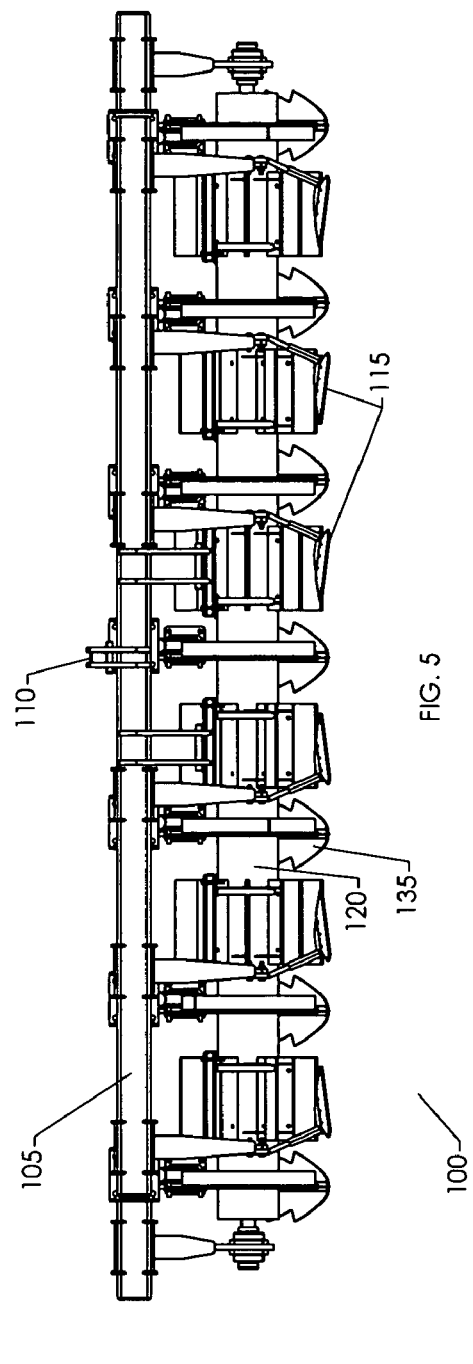
FIG. 5 is a front plan view of a single pass plow according to a first illustrative embodiment of the present invention
Figure 6:
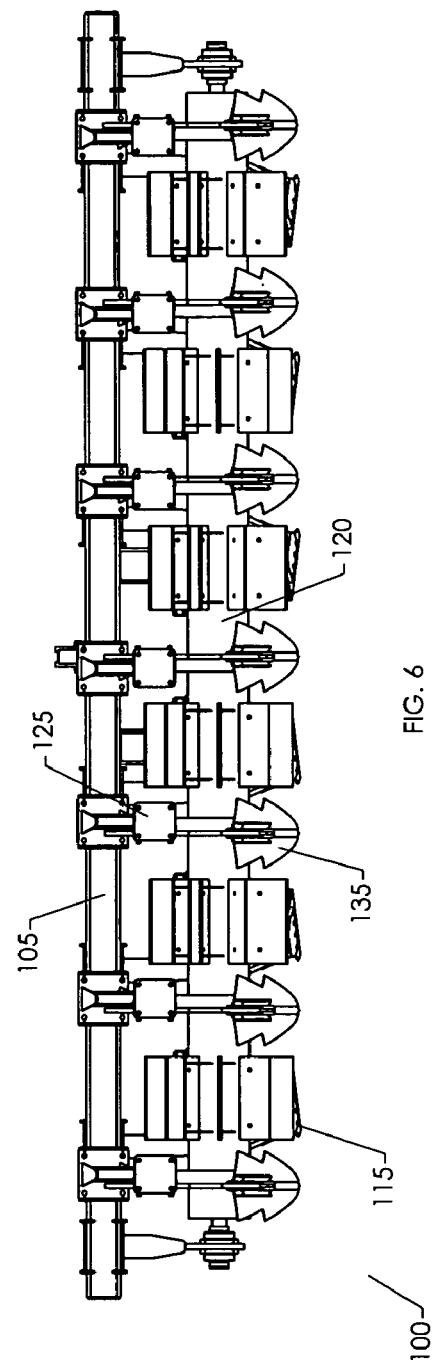
FIG. 6 is a rear plan view of a single pass plow according to a second illustrative embodiment of the present invention.

FIG. 5 is a front view of a single pass plow 100 according to a first illustrative embodiment of the present invention. Similarly, FIG. 6 is a rear view of a single pass plow 100 according to a first illustrative embodiment of the present invention. Both FIG. 5 and FIG. 6 illustrate a six row embodiment of the single pass plow 100.

Figure 7:
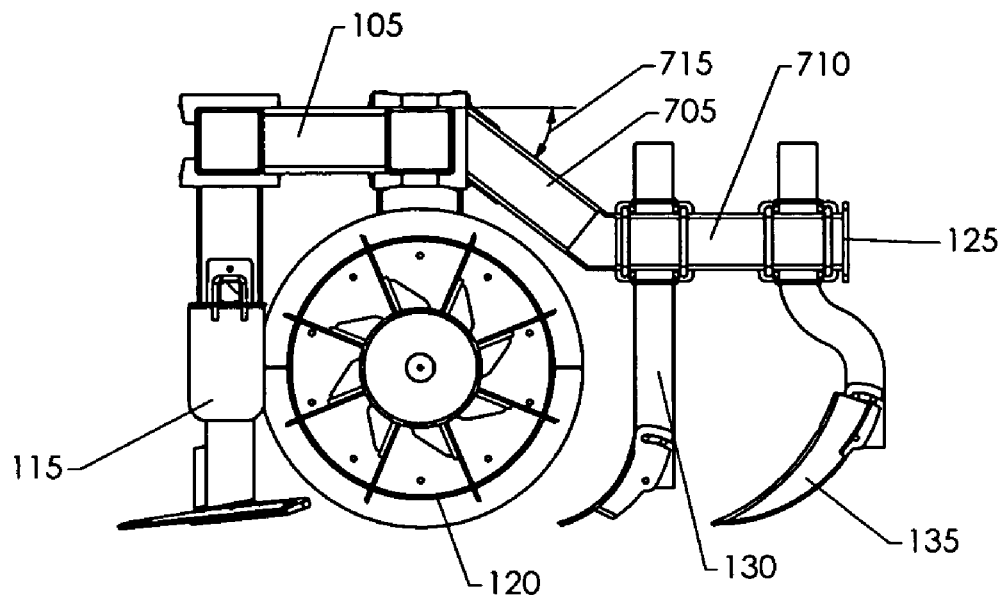
FIG. 7 is a first cross-sectional view of a single pass plow taken along lines A-A' of FIG. 3.
Figure 8:
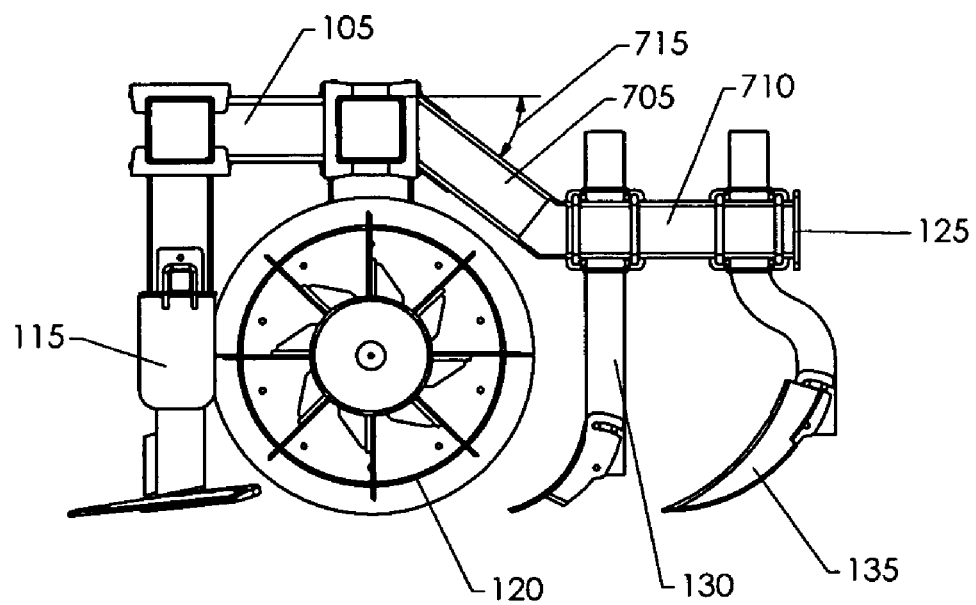
FIG. 8 is a second cross-sectional view of a single pass plow taken along lines B-B' of FIG.3.

FIGS. 7-8 are cross-sectional views of the single pass plow 100 of FIG. 3. FIG. 7 is a cross-sectional view of the single pass plow 100 of FIG. 3 taken along axis A-A' and FIG. 8 is a cross-sectional view of the single pass plow 100 of FIG. 3 taken along axis B-B'. As shown in FIGS. 7-8, the one or more shear assemblies 115 of the single pass plow 100 may be positioned immediately in front of the cylinder assembly 120 of the single pass plow 100. The one or more support arms 125 of the single pass plow 100 may extend rearwardly from the tool bar 105. The one or more shear assemblies 115 and the cylinder assembly 120 may extend from the tool bar 105 in the same direction and in a parallel relationship with respect to the tool bar 105. Also shown in FIGS. 7-8, one or more of the support arms 125 may include a downwardly angled portion 705 and an attachment portion 710. The attachment portion 710 may be a horizontal section of the support arm 125 to which ground working implements may attach. The one or more ground working implements may extend from the tool bar 105 in the same direction as the one or more shear assemblies 115 and the cylinder assembly 120 in a parallel relationship with respect to the tool bar 105. The downwardly angled portion 705 of the support arm 125 may operate to lower the vertical position of the attachment portion 710 relative to the vertical position of the tool bar 105. Accordingly, ground working implements may be connected to the attachment portion 710 of a support arm 125 at a lower vertical position than the vertical position of the tool bar 105, thereby decreasing the length required for any shanks incorporated into or connecting to the ground working implements. Utilizing shorter shafts in conjunction with the ground working implements may provide greater strength and leverage to the shafts and the ground working implements. It will be understood that many different downward angles 715 may be utilized for the downwardly angled portion 705 of the support arm 125 such as, for example, a downward angle 715 of approximately 25 to approximately 40 degrees. According to an aspect of the present invention, the downward angle 715 may be approximately 38 degrees. It will also be understood that the diameter of the cylinder assembly 120 may limit the downward angle 715 of the downwardly angled portion 705 as it may be advantageous for the support arm 125 to not make contact with the cylinder assembly 120.

While the single pass plow 100 is being pulled through agricultural land, the one or more shear assemblies 115 may first operate on the agricultural land, followed by the cylinder assembly 120 and then the ground working implements attached to the one or more support arms 125. As shown in FIGS. 7-8, a chisel assembly 130 and a buster assembly 135 may be attached to each of the one or more support arms 125. The operation of each of these components of the single pass plow 100 is described in greater detail below with reference to FIGS. 9-14.

Figure 9B:
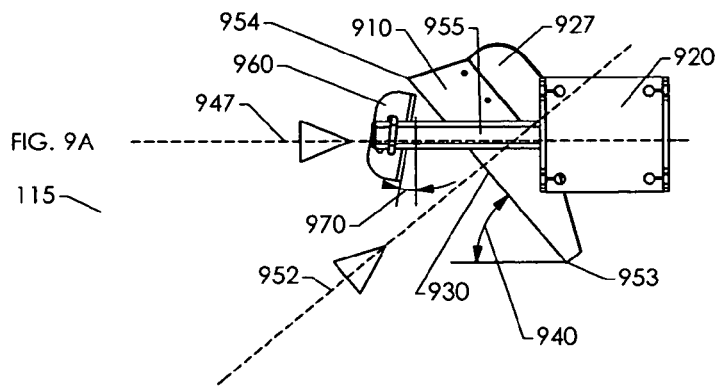
FIG. 9B is a first plan side view of a shear assembly of a single pass plow according to an illustrative embodiment of the present invention.
Figure 9B:
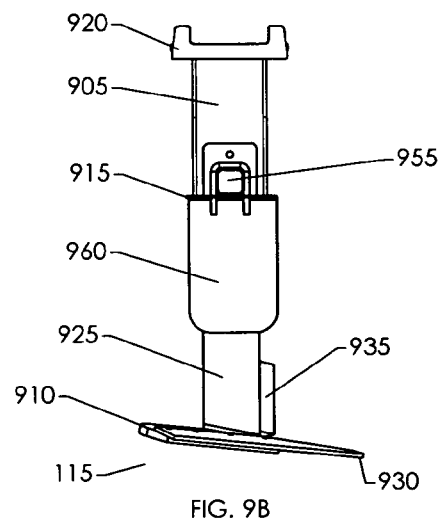
Figure 9C:
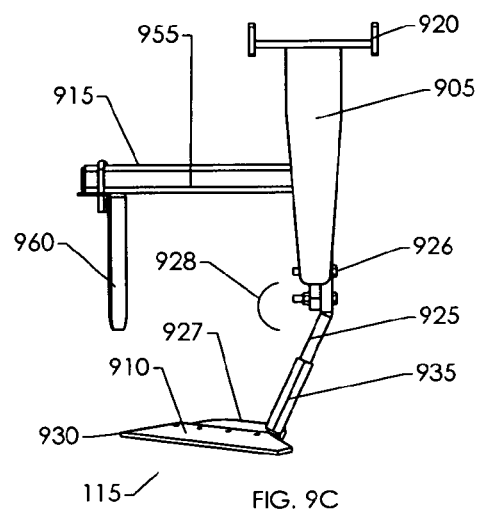
FIG. 9C is a first perspective view of a shear assembly of a single pass plow according to an illustrative embodiment of the present invention.

FIGS. 9A-9E depict various views of a shear assembly 115 of a single pass plow 100 according to an illustrative embodiment of the present invention. FIG. 9A is a top view of a shear assembly 115; FIG. 9B is a side view of a shear assembly 115; and FIG. 9C is a perspective view of a shear assembly 115. As shown in FIGS. 9A-9C, the shear assembly 115 may include a shear support 905, a blade assembly 910, a stalk manager assembly 915, a shear assembly mount 920, and a shear shank 925.

The shear support 905 may extend downwardly from the tool bar 105 of the single pass plow 100. The shear assembly mount 920 may be removably attached to, fixedly attached to, or incorporated into the shear support 905, and the shear assembly mount 920 may be used to removably attach the shear assembly 115 to the tool bar 105 of the single pass plow 100. By removably attaching the shear assembly 115 to the tool bar 105, the shear assembly 115 may be laterally moved along the length of the first cross bar 140 of the tool bar 105. It will, however, be understood that the shear assembly 115 may be fixedly attached to the tool bar 105. A connection or attachment between the shear assembly mount 920 and the tool bar 105 may be made by any suitable means such as, for example, bolts, screws, pins, and/or welds.

The shear shank 925 may be removably or fixedly connected to or attached to the distal end of the shear support 905. According to an aspect of the present invention, the shear shank 925 may be removably attached to the shear support 905 and may further be vertically adjustable with respect to the shear support arm 905. The shear shank 925 may be connected to the shear support 905 by any suitable means such as, for example, bolts, screws, or pins. For example, the shear shank 925 may include one or more attachment holes 926 positioned in a vertical line along the shear shank 925. Bolts or screws may be inserted through both a portion of the one or more attachment holes 926 and the shear support 905, thereby forming a connection between the shear support 905 and the shear shank 925. In order to adjust the vertical position of the shear shank 925 with respect to the shear support 905, the shear shank 925 may be connected to the shear support 905 by utilizing a different portion of the one or more attachment holes 926. By adjusting the vertical position of the shear shank 925 with respect to the shear support 905, the vertical position of the blade assembly 910 of the shear assembly 115 may be adjusted. It will, however, be understood that the vertical position of the blade assembly 910 may be adjusted by other means including, but not limited to, a telescopic shear support 905, a telescopic shear shank 925, or a telescopic connection between the shear support 905 and the shear shank 925. According to an aspect of the present invention, the vertical position of the blade assembly 910 may be configured such that the blade assembly 910 operates at a subsurface depth of approximately one to eight inches, although it will be understood that the blade assembly 910 may be configured to operate at any vertical height either above or below the surface.

The shear shank 925 may include a foot portion 927 at its distal end. The blade assembly 910 may be connected to or attached to the foot portion 927 of the shear shank 925 by any suitable means such as, for example, bolts screws, pins, or welding. The angle at which the foot portion 927 joins the remainder of the shear shank 925 may be determined by the various angles associated with the blade assembly 930, as described in greater detail below. The shear shank 925 may also include a shank angle 928 as it extends downwardly from the shear support 905. The shank angle 928 may cause the shear shank 925 to extend away from the shear support 905 in a lateral direction, thereby contributing to the ability of the blade assembly 910 to operate on agricultural crops without the shear support 905 becoming entangled with the crops. For example, while the blade assembly 910 is operating beneath a row of crops, the shear support 925 may be positioned to the side of the row of crops or to the side of the main stalks of the plants within the row of crops. It will be understood that many different shank angles 928 may be utilized by the present invention such as, for example, a shank angle 928 that is within the range of approximately 10 degrees to approximately 45 degrees. According to an aspect of the present invention, the shank angle 928 may be approximately 24.5 degrees. It will also be understood that the shank angles 928 of the various shear shanks 925 may vary according to the row to row spacing of the crops situated on the agricultural land.

Additionally, the blade assembly 910 may include a cutting edge 930 that is configured to cut through the ground and the root zone of the crops that are situated within a row of agricultural land. The cutting edge 930 of the blade assembly 910 may cut a subsurface swath or section through the row of crops. Additionally, it will be understood that the cutting edge 930 may not be configured to turn the soil through which it operates; however, it is possible that the cutting edge 930 and the blade assembly 910 may turn a portion of the soil through which it operates.

The subsurface section that is cut by the cutting edge 930 may have a wide variety of lateral cutting widths such as, for example, a lateral width of approximately eighteen inches. The lateral cutting width may be the width of the subsurface swath or section that it is cut by the cutting edge 930 as it travels through agricultural ground. An eighteen inch lateral cutting width may be utilized to help ensure that the cutting edge 930 cuts through a majority or all of the root system of the crops that are planted in a particular row. For many agricultural crops such as, for example, corn, soy beans, and cotton, the lateral width of the seed bed of the crops does not exceed approximately eighteen inches. Accordingly, a majority or all of the root system of the crops may be cut or severed if the cutting edge 930 has a lateral cutting width of approximately eighteen inches. For taproot crops such as, for example, cotton, the cutting edge 930 may sever the taproot as the single pass plow 100 is pulled through agricultural land.

It will be understood that the various components of the shear assembly 115 may be constructed of steel or any other suitable material such as, for example, iron, plastic, aluminum, synthetic fibers, polymers, steel or other metal alloys, solid steel, other metals, ceramics or a combination of materials. It will also be understood that as components of the shear assembly 115 make contact with agricultural ground, the components of the shear assembly 115 may experience wear. For example, the shear shank 925 may experience wear as when the shear assembly 115 is pulled through agricultural ground. In order to minimize the wear on the shear shank 925, a shin 935 may be permanently or removably attached to the front of the shear shank 925. The shin 935 may be attached to the shear shank 925 by any suitable means such as, for example, bolts, screws, pins, or welds. As shown in FIGS. 9B-9E, the shin 935 may have a triangular solid shape; however, it will be understood that the shin 935 may have many different shapes such as, for example, a rectangular solid shape, or a semicircular solid shape. As the shear assembly 115 is pulled through agricultural ground, the shin 935 may protect the shear shank 925 and minimize wear on the shear shank 925. Additionally, the shin 935 may assist the shear assembly 115 in cutting through the soil of the agricultural ground and may additionally assist in cutting vegetation or other materials situated within the soil. For example, if the shin 925 has a triangular solid shape, one of the points of the triangle may face the front of the single pass plow 100 and that point may assist the shear assembly 115 in cutting through the soil and any vegetation or other materials situation within the soil.

The blade assembly 910 and foot portion 927 of the shear shank 925 may contact or be affixed to the shear shank 925 at any angle. According to an aspect of the present invention, the blade assembly 910 may be angled such that the cutting edge 930 of the blade assembly 910 is diagonal to the front of the single pass plow 100, allowing cut, sliced or severed material to slide off of the blade assembly 910. As shown in FIG. 9A, the blade assembly 910 may include or incorporate a swept back angle 940 that defines an angle in the horizontal plane at which the blade assembly 910 contacts the root zone of the crops and other material situated in an agricultural row. By providing a swept back angle 940, cut material may slide off of the cutting edge 930 and the blade assembly 910, thereby assisting in the prevention of materials accumulating on the cutting edge 930 and the blade assembly 910. The swept back angle 910 may also assist in the cutting of roots and other materials. As the shear assembly 115 passes through a row of crops, the forward momentum of the single pass plow 100 will cause any material contacted by the cutting edge 930 to travel down the length of the cutting edge 930, thereby assisting in the severing or cutting of that material.

Due to the swept back angle 940 of the blade assembly 910, in order to cut a subsurface swath having a lateral cutting width of approximately 18 inches, the length of the cutting edge 930 of the blade assembly 910 may be greater than approximately 18 inches. It will be understood that the greater the swept back angle 940, the easier it will be for the blade assembly 910 to slide or move through the soil and the rows of crops planted therein and the easier it will be for a prime mover to pull the single pass plow 100 over the agricultural land. In other words, as the angle of the swept back angle 940 increases, a prime mover will have to expend less energy or horsepower to pull the single pass plow 100. However, the greater the swept back angle 940, the greater the length of the cutting edge 930 required to have a lateral cutting width of approximately 18 inches. It will also be understood that the swept back angle 940 may be any angle between approximately zero and approximately ninety degrees such as, for example, an angle that is in the range of approximately 30 degrees to approximately 60 degrees. As shown in FIG. 9, the swept back angle 940 may be approximately 45 degrees. Accordingly, the length of the cutting edge 930 may be approximately 22 inches in order to have a lateral cutting width of approximately 18 inches. It will be understood that the length of the cutting edge 930 and the value of the swept back angle 940 may be virtually any length and angle respectively, as desired by a user of the single pass plow 100. Additionally, it will be understood that the value of the swept back angle 940 may be adjustable or fixed for a given shear assembly 115.

Figure 9D:
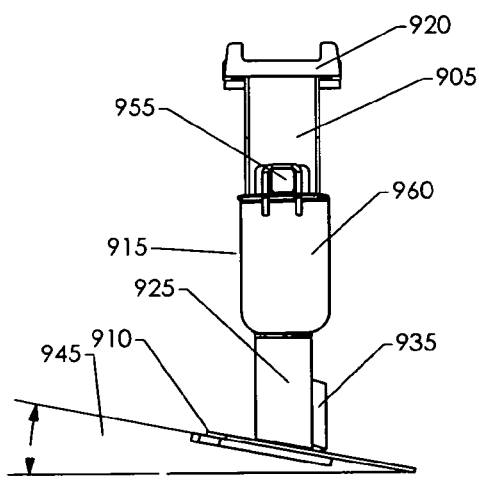
FIG. 9D is a second side plan view of a shear assembly of a single pass plow according to an illustrative embodiment of the present invention.

The blade assembly 910 of the shear assembly 115 may also contact the ground or terrain at an angle in the vertical direction, referred to herein as the blade lift angle 945. FIG. 9D is a side view of the shear assembly 115 of FIG. 9A viewed along a first axis 947. The blade lift angle 945 of the blade assembly 910 is shown in FIG. 9D. The blade lift angle 945 may assist in providing plow suction to the shear assembly 115. In other words, the blade lift angle 945 may function to pull the shear assembly 115 downward into the ground or terrain while the single pass plow 100 is being pulled through agricultural land. The shear assembly 115 may be pulled downward into the ground up to the limits of the one or more gauge wheels 1010 of the cylinder assembly 120, as explained in greater detail below with reference to FIG. 10. The blade life angle 945 may further assist in lifting cut vegetation and other materials from the terrain as that material may be pulled upward as it makes contact with the blade assembly 910.

Many different angles may be utilized for the blade lift angle 945 such as, for example, angles that are less than approximately 45 degrees. According to an aspect of the present invention, the blade lift angle 945 may be any angle within the range of approximately 10 degrees to approximately 20 degrees. It will be understood that, as the value of the blade lift angle 945 increases, the power required to pull the single pass plow 100 through agricultural land may increase. Additionally, the plow suction created by the blade assembly 910 may increase as the blade lift angle 945 increases. Conversely, as the value of the blade life angle 945 decreases, the power required to pull the single pass plow through agricultural land may decrease. Additionally, the plow suction created by the blade assembly 910 may decrease as the blade lift angle 945 decreases. It will be understood that the value of the blade lift angle 945 may be adjustable or fixed for a given shear assembly 115.

Figure 9E:
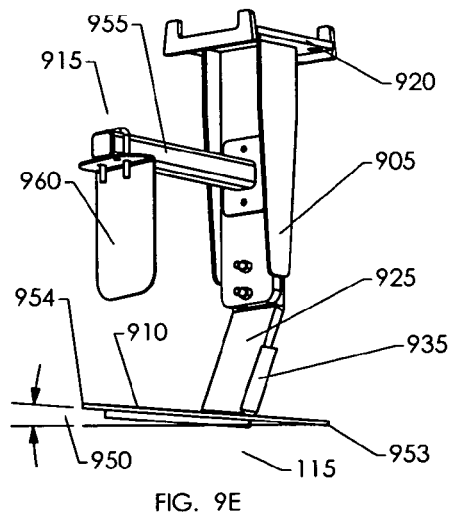
FIG. 9E is a second perspective view of a shear assembly of a single pass plow according to an illustrative embodiment of the present invention.

The cutting edge 930 of the blade assembly 910 may also be angled along its length, which will be referred to herein as the cutting edge angle 950. FIG. 9E is a perspective view of the shear assembly 115 of FIG. 9A viewed along a second axis 952. The cutting edge angle 950 is illustrated in FIG. 9E. The cutting edge 930 may include both a leading point 953 and a trailing point 954. The leading point 953 of the cutting edge 930 may be the first portion of the cutting edge 930 that makes contact with the terrain when the single pass plow 100 is being pulled through agricultural ground, and the trailing point 954 of the cutting edge may be the last portion of the cutting edge 930 to make contact with the terrain when the single pass plow 100 is being pulled through agricultural ground. Additionally, the trailing point 954 of the cutting edge 930 may be situated at the distal end of the cutting edge 930 relative to the leading point 953. The cutting edge angle 950 may be a vertical angle formed along the length of the cutting edge 930 that results in the leading point 953 making contact with the terrain prior to the trailing point 954.

Similar to the blade lift angle 945, the cutting edge angle 950 may assist in creating downward plow suction, thereby pulling the shear assembly 115 downward into the ground or terrain while the single pass plow 100 is being pulled through agricultural land. The shear assembly 115 may be pulled downward into the ground up to the limits of the one or more gauge wheels 1010 of the cylinder assembly 120, as explained in greater detail below with reference to FIG. 10. The cutting edge angle 950 may further assist in lifting cut vegetation and other materials from the terrain as that material may be pulled upward as it makes contact with the blade assembly 910.

Many different angles may be utilized for the cutting edge angle 950 such as, for example, angles that are less than approximately 45 degrees. According to an aspect of the present invention, the cutting edge angle 950 may be any angle within the range of approximately 5 degrees to approximately 30 degrees. It will be understood that, as the value of the cutting edge angle 950 increases, the power required to pull the single pass plow 100 through agricultural land may increase. Additionally, the plow suction created by the blade assembly 910 may increase as the cutting edge angle 950 increases. Conversely, as the value of the cutting edge angle 950 decreases, the power required to pull the single pass plow through agricultural land may decrease. Additionally, the plow suction created by the blade assembly 910 may decrease as the cutting edge angle 950 decreases. It will be understood that the value of the cutting edge angle 950 may be adjustable or fixed for a given shear assembly 115.

The stalk manager assembly 915 or deflector assembly is also shown in FIG. 9. The stalk manager assembly 915 may assist in guiding the stalks of crops through the single pass plow 100. The stalk manager assembly 915 may include a stalk manager support 955 and a deflector 960. The stalk manager support 955 may be a horizontal arm or beam that is fixedly or removably attached to the shear support 905 by any suitable means such as, for example, by bolts, screws, pins, or welds. It will also be understood that the stalk manager support 915 may be vertically adjustable along the length of the shear support 955, as described above with reference to the shear shank 925. The deflector 960 may extend downwardly from any point along the length of the stalk manager support 955 such as, for example, at the distal end of the stalk manager support 955. The deflector 960 may be fixedly or removably attached to the stalk manager support 955 by any suitable means such as, for example, by bolts, screws, pins, or welds. Additionally, the deflector 960 may be laterally adjustable along the length of the stalk manager support 955. The length of the deflector 960 may be determined in part by the depth at which the blade assembly 930 is being pulled through the terrain or the depth at which the single pass plow 100 is plowing. To assist in preventing the deflector 960 from wearing, it may be desirable to prevent the deflector 960 from contacting the ground. Accordingly, the length of the deflector 960 may be any suitable length with minimal contact between the deflector 960 and the ground. The deflector 960 may also be connected to the stalk manager support 955 at a wide variety of deflector angles 970 such as, for example, at an angle of approximately zero to approximately twenty degrees with respect to the side of the shear support 905. The deflector angle 970 may assist in guiding any stalks or other vegetation of the crops towards the blade assembly 910. In addition, the face of the deflector 960 may be slightly opened towards the crops at the deflector and the blade assembly 910 at the deflector angle 970, as shown in FIG. 9A, thereby assisting in guiding stalks and vegetation into the blade assembly 910.

In operation the stalk manager assembly 915 may contact stalks and other vegetation and assist in guiding it into the blade assembly 910. As stalks and vegetation contact the stalk manager assembly 915, the stalks and vegetation may be held in an upright position and/or pushed forward by the stalk manager assembly 915 as the single pass plow 100 is pulled through a field, thereby allowing the stalks and vegetation to be more easily cut by the blade assembly 110. Additionally, for some types of crops such as, for example, corn, the stalk manager assembly 915 may assist in lifting stalks and other vegetation as the stalks and other vegetation make contact with the top of the stalk manager support 915.

Figure 10:
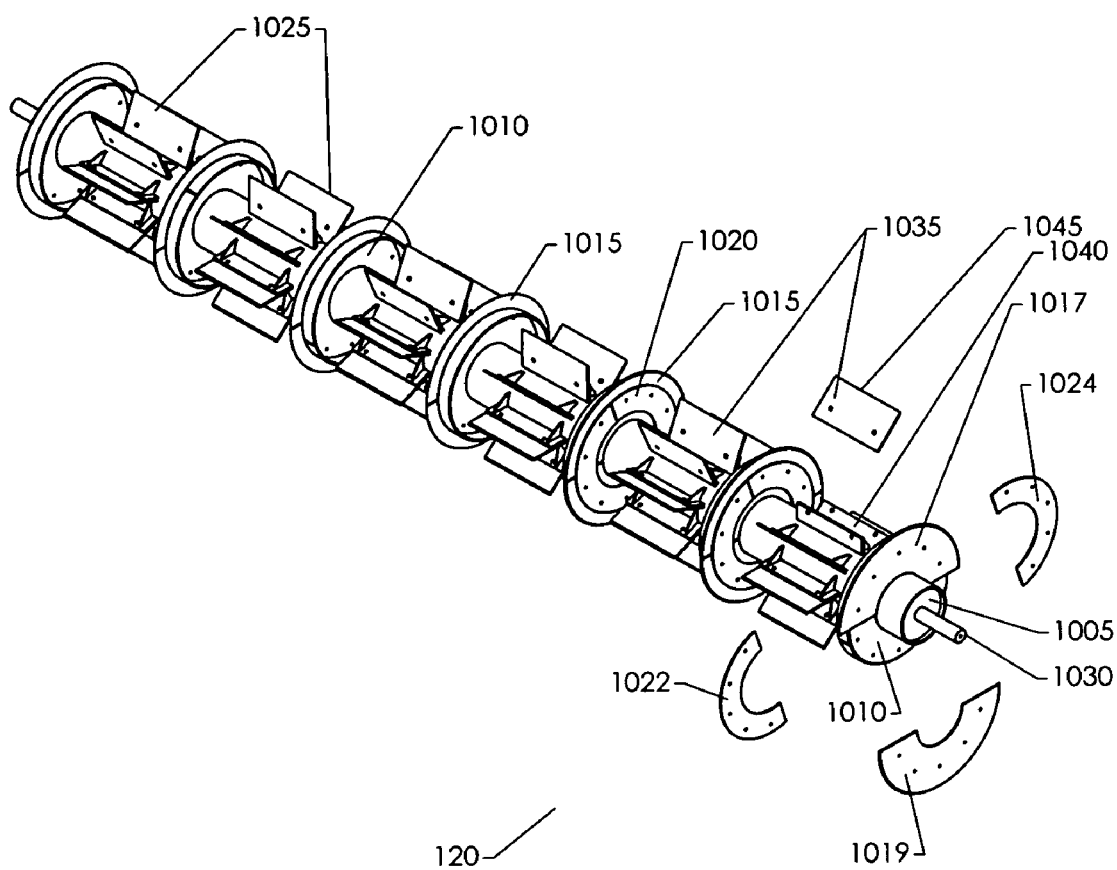
FIG. 10 is a partially exploded perspective view of a cylinder assembly of a single pass plow according to an illustrative embodiment of the present invention.

In addition to guiding stalks and vegetation into the blade assembly 910, the stalk manager assembly 915 may also assist in guiding stalks and vegetation into the cylinder assembly 120, which will be described in greater detail below with reference to FIG. 10. It will be understood that many different types of stalk manager assemblies may be used in accordance with the present invention in addition to or as an alternative to the stalk manager assembly 915 described above. For example, a U-shaped collector or a plant lifter may be utilized as a stalk manager assembly in accordance with the present invention.

With general reference back to FIGS. 7-8, a cylinder assembly 120 may be attached to the tool bar 105 in a position behind the one or more shear assemblies 115. FIG. 10 is a partially exploded perspective view of a cylinder assembly 120 that may be utilized in conjunction with a single pass plow 100, according to an illustrative embodiment of the present invention. The cylinder assembly 120 may include a cylinder body 1005, one or more gauge wheels 1010, one or more coulters 1015, one or more coulter retainers 1020, one or more blade assemblies 1025, and one or more shafts 1030. A six row cylinder assembly 120 is depicted in FIG. 10; however, it will be understood that a cylinder assembly 120 may be configured to operate on any number of rows of crops. Additionally, it will be understood that the single pass plow 100 may include one or more cylinder assemblies 120. The cylinder assembly 120 may be configured to rotate as the single pass plow is pulled through a section of agricultural ground. The cylinder assembly 120 may rotate through the motion of the single pass plow 100 or, alternatively, the cylinder assembly 120 may be rotated by a motor.

The cylinder body 1005 may be a circular pipe that extends through substantially the entire length of the cylinder assembly 120. The cylinder body 1005 may be a hollow steel pipe; however, it will be understood that a solid steel pipe or a hollow or solid pipe made out of another material such as, for example, aluminum, other metals, plastic, synthetic fibers, polymers, ceramics, or any combination of materials may be utilized for the cylinder body 1005. It will also be understood that the cylinder body 1005 need not be circular, but can take any shape such as for example, a hexagonal or octagonal pipe. For purposes of the present disclosure, the cylinder body 1005 is described as a hollow steel pipe because the hollow steel pipe may provide at least partial strength and support for the remainder of the cylinder assembly 120 while still maintaining a relatively light weight. Additionally, the cylinder body 1005 is described as a circular pipe because a circular pipe may easily be rotated as the single pass plow 100 is pulled over agricultural land while causing fewer vibrations than pipes of other shapes.

The cylinder assembly 120 may additionally include one or more gauge wheels 1010. Each of the one or more gauge wheels 1010 may be laterally positioned in a spaced relationship along the cylinder body 1005 in the space or area between two adjacent rows of crops. Each of the one or more gauge wheels 1010 may be fixedly or removably attached to the circumference of the cylinder body 1005 or, alternatively, the one or more gauge wheels 1010 may not be attached to the circumference of the cylinder body 1005. Additionally, the one or more gauge wheels 1010 may operate to support or carry the weight of the single pass plow 100 as the single pass plow 100 is pulled through agricultural land. The one or more gauge wheels 1010 may be constructed of steel or any other suitable material such as, for example, rubber, aluminum, other metals, synthetic fibers, polymers, ceramics, or a combination of materials. Additionally, it will be understood that the one or more gauge wheels 1010 may be substantially or completely round wheels; however, it will be understood that other shapes of gauge wheels 1010 may be used in accordance with the present invention such as, for example, hexagonal or octagonal wheels.

It will also be understood that the many different values may be utilized for the diameter of the one or more gauge wheels 1010 such as, for example, a diameter in the range of approximately 20 inches to approximately 35 inches. According to an aspect of the present invention, the diameter of the one or more gauge wheels 1010 may be approximately 28 inches.

The cylinder assembly 120 may additionally include one or more coulters 1015 that operate to cut any vegetation that is situated at or near the top of the soil through which the one or more coulters 1015 are pulled. Each of the one or more coulters 1015 may be laterally positioned in a spaced relationship along the cylinder body 1005 such that they operate in the area between two adjacent rows of crops of a section of agricultural land. Additionally, each of the one or more coulters 1015 may be laterally positioned adjacent to one side of the one or more gauge wheels 1010. Each of the one or more coulters 1015 may additionally be fixedly or removably attached or connected to the circumference of the cylinder body 1005 and/or to an adjacent gauge wheel 1010. The one or more coulters 1015 may be constructed of steel or any other suitable material such as, for example, aluminum, other metals, synthetic fibers, polymers, ceramics, or a combination of materials. Additionally, it will be understood that the one or more coulters 1015 may be substantially or completely round around an outer edge; however, it will be understood that other shapes of coulters 1015 may be used in accordance with the present invention such as, for example, hexagonal or octagonal wheels.

Each of the one or more coulters 1015 may include one or more parts. As shown in FIG. 10, each of the one or more coulters 1015 may include a first coulter half 1017 and a second coulter half 1019; however, it will be understood that each of the one or more coulters 1015 may include more or less than two parts. By providing two halves 1017, 1019, each of the coulters 1015 may be easily attached or connected to the cylinder body 1005 and/or a gauge wheel 1010.

It will also be understood that each of the one or more coulters 1015 may be laterally positioned at or substantially near the center between two rows of crops. While the single pass plow 100 is being pulled over agricultural land, the one or more coulters 1015 may stabilize the single pass plow 100 and assist in preventing lateral movement of the single pass plow 100. In other words, the one or more coulters 1015 may assist in keeping the single pass plow 100 in a straight line as it is being pulled across agricultural land. The one or more coulters 1015 may also assist in cutting any vegetation or other debris that are present between the one or more rows of crops, thereby assisting in the prevention of accumulation of the vegetation and other debris on the chisel assembly 130 and/or the rowing device 135, as will be explained in greater detail below with reference to FIGS. 11-12.

The diameter of the one or more coulters 1015 may be greater than the diameter of the one or more gauge wheels 1010. Providing a greater diameter for the one or more coulters 1015 may assist in the lateral stabilization of the single pass plow 100. It will be understood that many different diameters may be utilized for the one or more coulters 1015 such as for example, a diameter that is approximately two to eight inches greater than the diameter of the one or more gauge wheels 1010. According to an aspect of the present invention, the diameter of the one or more coulters 1015 may be approximately six inches greater than the diameter of the one or more gauge wheels 1010. Accordingly, if the one or more gauge wheels 1010 have a diameter of approximately 28 inches, the one or more coulters 1015 may have a diameter of approximately 34 inches. Additionally, the one or more coulters 1015 may extend into the soil and cut or sever any encountered vegetation as the single pass plow 100 is pulled through a field. If the diameter of the one or more coulters 1015 is approximately six inches greater than the diameter of the one or more gauge wheels 1010, then the one or more coulters 1015 may extend approximately three inches into the soil and cut or sever any encountered vegetation.

The cylinder assembly 120 may also include one or more coulter retainers 1020. Each of the one or more coulter retainers 1020 may be laterally positioned adjacent to a coulter 1015. The one or more coulter retainers 1020 may operate to assist in securing and strengthening the coulter 1015 that it is adjacent to. Each of the one or more coulter retainers 1020 may additionally be fixedly or removably attached or connected to the circumference of the cylinder body 1005 and/or to an adjacent coulter 1015. The one or more coulter retainers 1020 may be constructed of steel or any other suitable material such as, for example, aluminum, other metals, synthetic fibers, polymers, ceramics, or a combination of materials. Additionally, it will be understood that the one or more coulter retainers 1020 may be substantially or completely round along an outer edge; however, it will be understood that other shapes of coulter retainers 1020 may be used in accordance with the present invention such as, for example, hexagonal or octagonal wheels.

Each of the one or more coulter retainers 1020 may include one or more parts. As shown in FIG. 10, each of the one or more coulter retainers 1020 may include a first coulter retainer half 1022 and a second coulter retainer half 1024; however, it will be understood that each of the one or more coulter retainers 1020 may include more or less than two parts. By providing two halves 1022, 1024, each of the coulter retainers 1020 may be easily attached or connected to the cylinder body 1005 and/or a coulter 1015. Additionally, the two halves 1022, 1024 of a coulter retainer 1020 may be phase shifted from the two halves 1017, 1019 of an adjacent coulter 1015, thereby providing greater strength to both the coulter 1015 and the coulter retainer 1020. A wide range of phase shifts may be utilized in accordance with the present invention when a coulter retainer 1020 is laterally positioned adjacent to a coulter 1015 such as, for example, a 180 degree phase shift.

The cylinder assembly 120 may additionally include one or more blade assemblies 1025. The one or more blade assemblies 1025 may be laterally positioned along the cylinder body 1005 such that a blade assembly 1025 is present between each set of adjacent gauge wheels 1010. Additionally, the center of each blade assembly 1025 may be longitudinally aligned with a corresponding shear assembly 115 positioned in front of the blade assembly 1025, such that the blade assembly 1025 is operable to roll across a row of crops.

Each of the one or more blade assemblies 1025 may include one or more radially extending blades 1035. Each of the one or more blades 1035 may be fixedly or removably connected or attached to a blade mount 1040 by any suitable means such as, for example, bolts, screws, pins, welds, or any combination of attachment means. According to an aspect of the present invention, each of the one or more blades 1035 may be removably attached to a blade mount 1040, thereby allowing for replacement of each individual blade as desired by a user of the single pass plow 100. The blade mounts 1040 may further be fixedly or removably attached to the cylinder body 1005 by any suitable means such as, for example, bolts, screws, pins, welds, or any combination of attachment means. It will be understood that the lateral widths of the one or more blades 1035 and the one or more blade mounts 1040 along the length of the cylinder body 1005 may be any positive lateral width such as, for example, approximately eighteen inches. By providing one or more blades 1035 and one or more blade mounts 1040 that are approximately eighteen inches wide, each blade assembly 1025 may be operable to work on a row of crops with a seedbed width of approximately eighteen inches or less.

For each of the one or more blade assemblies 1025, the one or more blades 1035 and the one or more blade mounts 1040 may be spaced along the circumference of the cylinder body 1005. The spacing between each set of blades 1035 and blade mounts 1040 may be determined at least in part by the number of blades 1035 that are included in each blade assembly 1025. According to an aspect of the present invention, the one or more blades 1035 may be spaced along the circumference of the cylinder body 1005 such that the distance between each set of adjacent blades 1035 is substantially the same. Additionally, any number of blades 1035 may be incorporated into each blade assembly 1025 such as, for example, six blades, eight blades, or ten blades. In accordance with an aspect of the present invention, four to twenty blades 1035 may be incorporated into each blade assembly 1025.

In operation, as each of the one or more blade assemblies 1025 is pulled or rolled across a row of crops, the blades 1035 may serve to mash vegetation, stalks, and other debris into the ground. The blades 1035 may also assist in aerating, breaking, and/or mulching the ground. By mashing vegetation, stalks, and other debris into the ground, the blades 1035 may assist in the positioning of the vegetation, stalks, and other debris into future seedbeds, thereby encouraging the later decomposition of the vegetation, stalks, and other debris, as will be explained in greater detail below with reference to FIGS. 12 and 14. As the number of blades 1035 utilized in a blade assembly 1025 increases, the amount of aeration, ground breaking, and/or mulching performed by the blade assembly 1025 may increase; however, as the number of blades 1035 increases, it may become easier for soil and other materials to become compacted between two adjacent blades 1035, thereby clogging the blade assembly 1025 and interfering with its intended operation.

It will be understood that each of the one or more blades 1035 may take a variety of shapes such as, for example, a rectangular, square, or triangular shape. Each of the one or more blades 1035 may additionally include a cutting edge 1045 at its distal end that may assist in mulching vegetation, stalks, and other debris. The cutting edge 1045 may also function to assist in preventing the cylinder assembly 120 and the single pass plow 100 from being lifted as the cylinder assembly 120 rolls through a field, because the cutting edge 1045 may penetrate the soil as the cylinder assembly 120 is rolled through a field. The cutting edge 1045 may also take a variety of shapes and the shape of the cutting edge 1045 need not be the same as the shape of a blade 1035. For example a blade 1035 may have a rectangular shape and the cutting edge 1045 may have a triangular or arcuate shape.

It will also be understood that many different values may be utilized for the distance that each blade 1035 extends away from the circumference of the cylinder body 1005. For example, the distance that each blade 1035 extends away from the circumference of the cylinder body 1005, or the length of the blade, may be approximately six to nine inches. There are several considerations that may be taken into account when choosing an appropriate length for a blade 1035. First, it may be advantageous that the blade 1035 does not make contact with the shear assembly 115 positioned in front of the cylinder assembly 120. Additionally, to assist in preventing wear on the blade 1035, it may be beneficial that the blade 1035 does not extend more than approximately one or two inches beyond the diameter of a gauge wheel 1010. For example, setting the length of the blade 1035 to approximately one inch beyond the diameter of a gauge wheel 1010 may also assist in preventing the compaction of soil as the cylinder assembly 120 is rolled across a field. It will be understood that as the length of the blade 1035 gets smaller, less lift will be provided to the cylinder assembly 120 and the single pass plow 100 by the blade 1035; however, the vibration(s) that occurs as the cylinder assembly 120 rolls through a field may be increased.

The cylinder assembly 120 may additionally include one or more shafts 1030. Each of the one or more shafts 1030 may be utilized to connect the cylinder assembly 120 to one or more cylinder support arms 175 (FIG. 1A) that may be lateral positioned at each end of the cylinder assembly 120. As shown in FIG. 10, a shaft 1030 may be laterally positioned at each end of the cylinder assembly 120 and the shafts 1030 may partially extend into the cylinder body 1005. It will, however, be understood that it is possible to use a single shaft 1030 that extends all the way through the cylinder body 1005.

A cylinder support arm 175, as shown in FIGS. 1A-1B, may be connected to a shaft 1030 at each end of the cylinder assembly 120. At one end of a cylinder support arm 175, the cylinder support arm 175 may be fixedly or removably attached or connected to the tool bar 105 of the single pass plow 100 by any suitable form of attachment such as, for example, bolts, screws, pins, welds, or a combination of attachments. It will also be understood that the cylinder support arm 175 may be laterally adjustable along the length of the tool bar 105. At its distal end, the bearing assembly 175 may be connected to a shaft 1030. A shaft 1030 may extend into the cylinder support arm 175 and through one or more bearings that are attached to the cylinder support arm 175 at its distal end. Accordingly, the cylinder assembly 120 may be attached or connected to the one or more bearing assemblies 175 in such a manner that the cylinder assembly 120 is free to rotate.

With reference back to FIGS. 7-8, it may be advantageous to minimize the distance between a shear assembly 115 and a corresponding blade assembly 1025 of the cylinder assembly 120. As explained in greater detail below, minimizing this distance may contribute to vegetation, stalks, soil, and other debris being worked more easily by the single pass plow 100 because the motion of the vegetation, stalks, soil, and other debris may be constant and maintained as the single pass plow 100 is pulled through a field. Additionally, minimizing the distance between a shear assembly 115 and a corresponding blade assembly 1025 may assist in concentrating a greater portion of weight of the single pass plow 100 towards the front of the single pass plow 100, thereby making it easier for the single pass plow 100 to be lifted by a prime mover. Many different distances may exist between a shear assembly 115 and a corresponding blade assembly 1025 such as, for example, a within the range of approximately 0.5 inches to approximately 3 inches. According to an aspect of the present invention, the distance between a shear assembly 115 and a corresponding blade assembly 1025 may be approximately one inch or less.

It will also be understood that the positions at which one or more blades 1035 of adjacent blade assemblies 1025 are connected or attached to the diameter of the cylinder body 1005 may be phase shifted from one another. The cross section of the cylinder assembly 120 depicted in FIG. 8 depicts a blade assembly 1025 that is adjacent to the blade assembly 1025 depicted in FIG. 7. When comparing FIGS. 7 and 8, it may be observed that the positions at which the one or more blades 1035 attach to the blade assembly 1025 of FIG. 7 may be phase shifted from the positions at which the one or more blades 1035 attach to the adjacent blade assembly 1025 of FIG. 8. It will be understood that many different alignments of the one or more blades 1035 may be utilized in accordance with the present invention. For example, the one or more blades 1035 of a blade assembly 1025 may be positioned in the center points along the circumference of the cylinder body 1005 between the one or more blades 1035 of an adjacent blade assembly 1025. By phase shifting or positioning the one or more blades 1035 of a blade assembly 1025 in a different configuration than that of an adjacent blade assembly 1025, the lift generated by the cylinder assembly 120 may be minimized. Additionally, less vibration(s) may occur as the cylinder assembly 120 is rolled across a field, thereby assisting in the stabilization of the single pass plow 100.

With continued reference to FIGS. 7-8, one or more ground working implements may be connected to each of the one or more support arms 125 that extend rearwardly from the tool bar 105. As shown in FIGS. 7-8, a chisel assembly 130 and a rowing device 135 may be attached or connected to a support arm 125.

Figure 11:
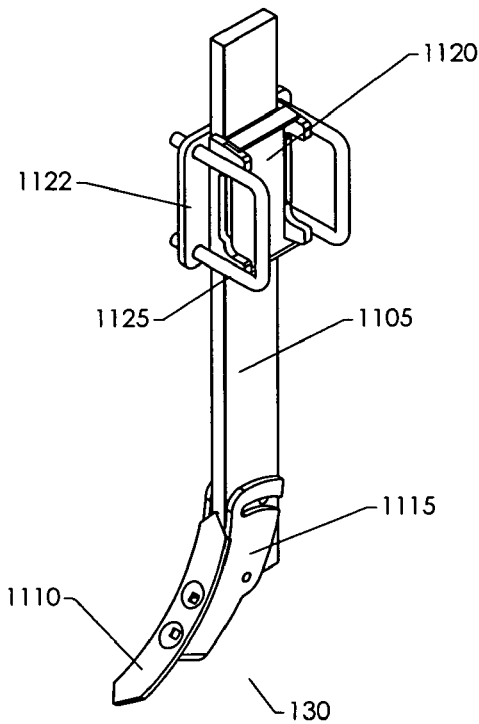
FIG. 11 is a perspective view of a chisel assembly that may be used in conjunction with a single pass plow according to an illustrative embodiment of the present invention.

FIG. 11 is a perspective view of a chisel assembly 135 that may be used in conjunction with a single pass plow 100 according to an illustrative embodiment of the present invention. The chisel assembly 135 may include a standard chisel plow as will be understood by those of ordinary skill in the art. As shown in FIG. 11, the chisel assembly 135 may include a chisel shank 1105, a chisel blade 1110, and a trip shank 1115. The chisel shank 1105 may be fixedly or removably attached to a support arm 125 of the single pass plow 100 by any suitable means such as bolts, screws, pins, welds, or the bracket described in greater detail below with reference to FIGS. 13A and 13B. At its distal end, the chisel shank 1105 may be fixedly or removably connected to the chisel blade 1110. It will further be understood that the chisel shank 1105 may be connected to the chisel blade 1110 via the trip shank 1115. The chisel assembly 130 may be laterally and/or vertically adjustable with respect to the support arm 125 to which it is attached, as will be explained in greater detail below.

As the single pass plow 100 is pulled through a field, the chisel assembly 130 may operate between two adjacent rows of crops. A chisel assembly 130 may be positioned behind one of the coulters 1015 of the cylinder assembly 120. The chisel blade 1110 may operate below the surface of the soil and may break the ground prior to a rowing device 135 operating on the ground. Additionally, the chisel blade 1110 may assist in aerating and loosening the soil between two adjacent rows of crops.

It will be understood that the chisel blade 1110 may be configured to operate at many different soil depths such as, for example, at a depth between approximately eight inches and approximately twelve inches. If the chisel blade 1110 contacts an object or substance that it cannot plow through, the trip shank 1115 may trip, causing the chisel blade 1110 to hinge rearwardly. Once the trip shank 1115 has been tripped, the chisel blade 1110 may no longer operate to break the ground, as will be understood by those of skill in the art. The various components of the chisel assembly 130 may be constructed of steel or any other suitable material such as, for example, iron, other metals, synthetic fibers, polymers, ceramics, or a combination of materials.

Figure 12:
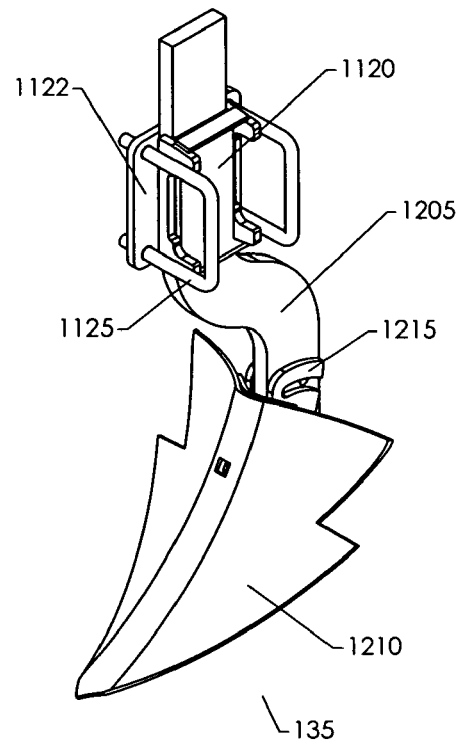
FIG. 12 is a perspective view of a buster assembly that may be used in conjunction with a single pass plow according to an illustrative embodiment of the present invention.

Many different types of rowing devices 135 may be utilized in conjunction with the present invention. As shown in the illustrative embodiments of the present invention in FIGS. 1-8, a buster assembly 135 may be used as a rowing device 135. FIG. 12 is a perspective view of a buster assembly 135 that may be utilized in conjunction with a single pass plow 100 according to an illustrative embodiment of the present invention. The buster assembly 135 may be a standard buster assembly as will be understood by those of ordinary skill in the art. Additionally, the buster assembly 135 may include a buster shank 1205, a buster blade 1210 and a trip shank 1215. The buster shank 1205 may be fixedly or removably attached to a support arm 125 of the single pass plow 100 by any suitable means such as bolts, screws, pins, welds, or the bracket described in greater detail below with reference to FIG. 13. At its distal end, the buster shank 1205 may be fixedly or removably connected to the buster blade 1210. It will further be understood that the buster shank 1205 may be connected to the buster blade 1210 via the trip shank 1215. The buster assembly 135 may be laterally and/or vertically adjustable with respect to the support arm 125 to which it is attached, as will be explained in greater detail below.

As the single pass plow 100 is pulled through a field, the buster assembly 135 may operate between two adjacent rows of crops. A buster assembly 135 may be positioned behind one of the coulters 1015 of the cylinder assembly 120. The buster blade 1210 may operate below and/or at the surface of the soil and may push the soil into furrows to make rows for planting crops. Additionally, the buster blade 1210 may assist in aerating and loosening the soil between two adjacent rows of crops.

Many different values for the lateral width of the buster blade 1210 may be utilized in accordance with the present invention such as, for example, lateral widths in the range of approximately seven inches to approximately twenty-two inches. It will be understood that the buster blade 1210 may be configured to operate at many different soil depths such as, for example, at a depth between approximately eight inches and approximately twelve inches. If the buster blade 1210 contacts an object or substance that it cannot plow through, the trip shank 1215 may trip, causing the buster blade 1210 to hinge rearwardly. Once the trip shank 1215 has been tripped, the buster blade 1210 may no longer operate to push the soil into furrows, as will be understood by those of skill in the art. The various components of the buster assembly 135 may be constructed of steel or any other suitable material such as, for example, iron, other metals, synthetic fibers, polymers, ceramics, or a combination of materials.

According to an aspect of the present invention, the chisel assembly 130, the buster assembly 135, and other ground working implements may be removably attached to a support arm 125 of the single pass plow 100. The various ground working implements may be laterally adjustable along the length of the support arm 125 and/or vertically adjustable. A wide variety of features may be utilized in accordance with the present invention to allow the various ground working implements to be laterally and/or vertically adjustable such as, for example, providing a plurality of adjustment holes along the lengths of both the support arm 125 and the shank of a ground working implement. Bolts or pins may then be inserted through one or more of these adjustment holes as desired to adjust the lateral and vertical position of the ground working implement. Additionally, the support arm 125 and/or the shank of a ground working implement may be telescopic, thereby allowing the lateral and vertical position of the ground working implement to be adjusted. According to an aspect of the present invention, the various ground working implements may be connected to a support arm 125 with an adjustable bracket that allows a ground working implement to be laterally and/or vertically adjusted.

Figure 13A:
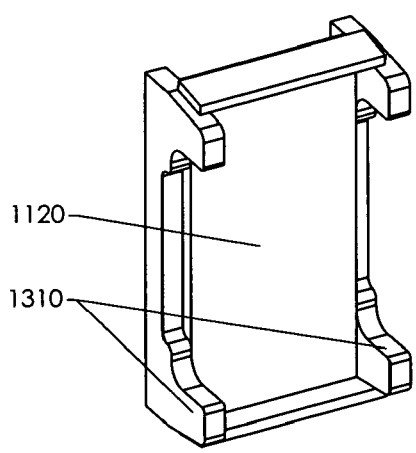
FIG. 13A is a front perspective view of a bracket that may be used to removably affix attachments to a support arm of a single pass plow according to an illustrative embodiment of the present invention.
Figure 13B:
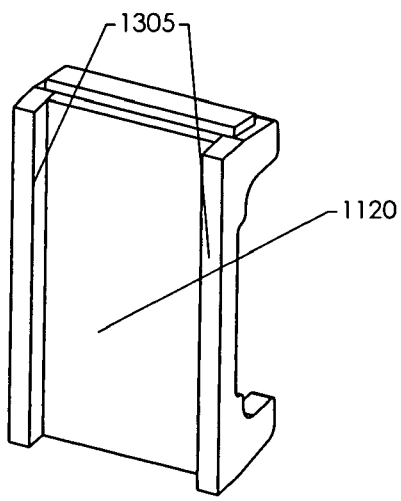
FIG. 13B is a rear perspective view of a bracket that may be used to removably affix attachments to a support arm of a single pass plow according to an illustrative embodiment of the present invention.

FIG. 13A is a front perspective view of a bracket 1120 that may be used to removably affix attachments to a support arm 125 of a single pass plow 100 according to an illustrative embodiment of the present invention. Similarly, FIG. 13B is a rear perspective view of a bracket 1120 that may be used to removably affix attachments to a support arm 125 of a single pass plow 100 according to an illustrative embodiment of the present invention. The back of the bracket 1120 may be positioned adjacent to the shaft of a ground working implement such as, for example, the chisel shaft 1105 of FIG. 11. The operation of the bracket 1105 will be described herein with reference to the chisel shaft 1105 of the chisel assembly 130; however, it will be understood that the bracket 1120 may be used in conjunction with a wide variety of other ground working implements. The back of the bracket may include two extensions 1305 that are configured to extend outwardly from the bracket 1120 and along the sides of the chisel shaft 1105. A bracket plate 1122 may then be placed on the opposite side of the chisel shaft 1105 from the bracket 1120, and the chisel shaft 1105 may be surrounded by the bracket plate 1122 and the back of the bracket 1120. The front of the bracket 1120 may then be positioned next to a support arm 125 of the single pass plow 100. The front of the bracket 1120 may include one or more extensions 1310 that extend outwardly from the bracket 1120 and along the peripheral edges of the support arm 125. Two U-bolts 1125 may then be positioned on the opposite side of the support arm 125 from the bracket 1120 and the bracket plate 1122. The U-bolts 1125 may extend around the three sides of the support arm 125 not adjacent to the bracket 1120, and the U-bolts 1125 may be inserted into the bracket plate 1122, thereby securing the chisel shaft 1105 to the support arm 125. It will be understood that the bracket 1120, bracket plate 1122, and U-bolts 1125 may be used to secure the chisel shaft 1105 to a support arm 125 at any vertical position along the length of the chisel shaft 1105 and at any lateral position along the length of the support arm 125. Accordingly, the chisel assembly 130 may be vertically and/or laterally adjustable in its connection to the support arm 125. It will also be understood that, although the bracket 1120, bracket plate 1122, and U-bolts 1125 are shown and described herein as being capable of securing a chisel shaft 1105 to a rectangular-shaped support arm 125, the bracket 1120, bracket plate 1122, and U-bolts 1125 could easily be designed to secure a chisel shaft 1105 to a support arm 125 with a different shape such as, for example, a circular support arm 125.

Figure 14A:
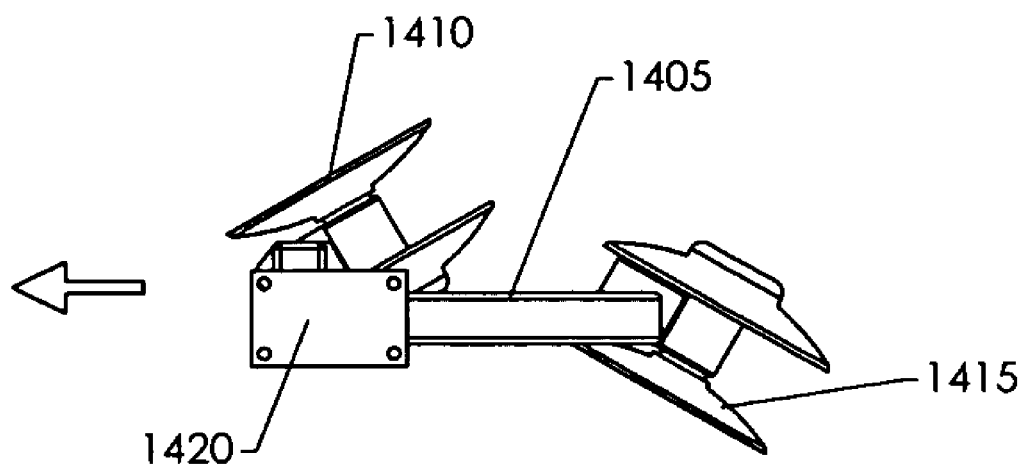
FIG. 14A is a top plan view of a hipper that may be used in conjunction with a single pass plow according to an illustrative embodiment of the present invention.
Figure 14B:
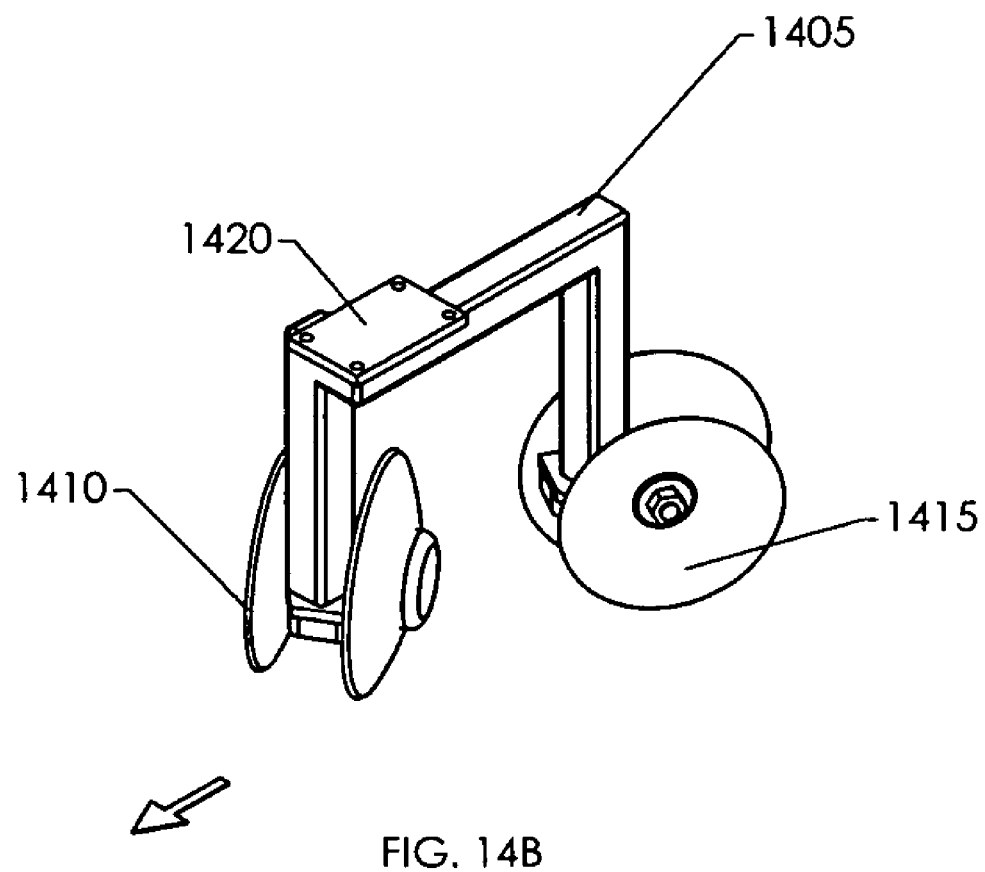
FIG. 14B is a perspective view of a hipper that may be used in conjunction with a single pass plow according to an illustrative embodiment of the present invention.

It will be understood that many different types of ground working implements may be attached to the one or more support arms 125 of the single pass plow 100. An example of another type of ground working implement is a hipper assembly which, similar to the buster assembly 135, may be utilized to form furrows or rows in the soil. FIG. 14A is a top view of a hipper assembly 1400 that may be used in conjunction with a single pass plow 100 according to an illustrative embodiment of the present invention. FIG. 14B is a perspective view of a hipper assembly 100 that may be used in conjunction with a single pass plow 100 according to an illustrative embodiment of the present invention. The hipper assembly 1400 may be a standard hipper assembly as will be understood by those of skill in the art. The hipper assembly 1400 may include a hipper mount 1405, a first hipper blade assembly 1410, a second hipper blade assembly 1415, and a hipper attachment plate 1420. The hipper mount 1405 may include two downward extensions. The first hipper blade assembly 1410 may connect or attach to one of the downward extensions and the second hipper blade assembly 1415 may connect or attach to the other downward extension. Each of the hipper blade assemblies 1410, 1415 may be vertically adjustable in its connection to the hipper mount 1405. For example, a telescopic connection may be formed between each of the hipper blade assemblies 1410, 1415 and the hipper mount 1405. Each set of hipper blade assemblies 1410, 1415 may include one or more angled disk blades that are configured to form soil into rows as the hipper assembly 1400 is pulled through a field. In operation, the first hipper blade assembly 1410 may throw dirt in one direction and the second hipper blade assembly 1415 may throw dirt in the opposite direction. The hipper assembly 1400 may be pulled through the area between two adjacent rows in agriculture land, thereby causing the rows to be reformed by the hipper assembly 1400. The hipper attachment plate 1420 may be connected to the top of the hipper mount 1405 and may be utilized to connect or attach the hipper assembly 1405 to either a support arm 125 or directly to the tool bar 105 of the single pass plow 100.

Other types of ground working implements that may be attached to the one or more support arms 125 of the single pass plow 100 may include, but are not limited to, disk harrows, moldboard plows, chisel plows, subsoilers, bedders, ridgers, cultivators, harrows, rotary hoes, seadbed conditioners, roller harrows, packers, rotary tillers, furrowers, and basket rollers. It will also be understood that ground working implements may also be attached or connected to the tool bar 105 of the single pass plow 100. For example, a seeder may be connected to the tool bar 105 of the single pass plow.

In operation, as the single pass plow 100 may be transported to a field by a prime mover. As the single pass plow 100 is then pulled through the field, the one or more shear assemblies 115 may be pulled through the rows of crops. The cutting edges 930 of the one or more shear assemblies 115 may operate below the soil and may cut any encountered stalks, roots, or vegetation. For many agricultural crops, an eighteen inch cutting width may sever the entire root mass. For tap root crops, the cutting edges 930 may sever the tap roots of the crops. The cut vegetation may then encounter the one or more blade assemblies 1025 of the cylinder assembly 120. The one or more blade assemblies 1025 may operate to mash the cut vegetation into the soil. Any vegetation that has fallen between the rows of crops may be cut by the one or more coulters 1015 of the cylinder assembly 120. The soil may also be aerated by the cylinder assembly 120. If one or more rowing devices 135 are utilized, then the one or more rowing devices 135 may form furrows out of the soil. The furrows may cover up the cut vegetation, thereby aiding in the decomposition of the vegetation. If one or more chisel assemblies 130 are utilized, then the one or more chisel assemblies 130 may loosen the ground before the one rowing devices 135 form furrows out of the soil. The single pass plow 100 of the present invention may be pulled through a field after a crop has been harvested. In a single pass, the single pass plow 100 may sever the root masses or tap roots of any planted crops, position the vegetation into rows, break the soil, aerate the soil, and form a seed bed for subsequent planting by position soil on top of the vegetation. After the single pass plow 100 has been pulled through the field, the field should be properly prepared for the planting of a subsequent crop.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A plow comprising:
   an elongated frame comprising a first cross bar and a second cross bar positioned behind the first cross bar in a parallel relationship;
   a plurality of support arms extending from the second cross bar;
   a plurality of shear assemblies affixed to the first cross bar in a spaced relationship along a length of the first cross bar, wherein each of the shear assemblies comprises (i) a shear support extending downwardly from the first cross bar, (ii) a shank portion extending at a lateral angle from a distal portion of the shear support, and (iii) a shearing blade attached at a swept back angle in a lateral direction to a distal end of the shank portion;
   a cylinder assembly rotatably affixed at both ends to the second cross bar and positioned parallel to the plurality of shear assemblies and configured to rotate as the plow is pulled through a field, the cylinder assembly comprising:
      a cylinder body defining a common axis;
      a plurality of cylinder blade assemblies laterally positioned along the common axis, each blade assembly positioned immediately behind a respective one of the plurality of shear assemblies and comprising a plurality of cylinder blades radially extending from the cylinder body; and
      one or more coulters positioned along the common axis and respectively attached to the cylinder body between adjacent cylinder blade assemblies; and
   a plurality of rowing devices, wherein each of the rowing devices is attached to a respective support arm behind the plurality of shear assemblies and the cylinder assembly and at a respective lateral position between adjacent shear assemblies,
   wherein, as the plow is pulled through the field, (i) the shear supports pass between adjacent rows of planted vegetation as the shearing blades operate below the surface of the soil to sever the roots of the planted vegetation, (ii) the plurality cylinder blade assemblies mulch the soil and press the severed vegetation into the soil, (iii) the one or more coulters sever vegetation between adjacent shear assemblies, and (iv) the plurality rowing devices reposition soil on top of the severed vegetation to form furrows and create a seedbed.

2. The plow of claim 1, wherein the vertical position of each shearing blade is adjustable.

3. The plow of claim 1, wherein the plurality of support arms are configured to hold one or more ground working implements.

4. The plow of claim 3, wherein the one or more ground working implements are laterally adjustable along the length of a respective support arm.

5. The plow of claim 3, wherein the one or more ground working implements are vertically adjustable in their attachment to a respective support arm.

6. The plow of claim 3, wherein each of the plurality of rowing devices is laterally adjustable or vertically adjustable in its attachment to a respective support arm.

7. The plow of claim 3, wherein the one or more ground working implements comprise a plurality of chisel assemblies, each chisel assembly attached to a respective support arm immediately prior to a respective rowing device and configured to break the ground between two adjacent rows of planted vegetation.

8. The plow of claim 1, wherein the cylinder assembly further comprises:
   a plurality of gauge wheels laterally positioned along the common axis and respectively attached to the cylinder body between adjacent cylinder blade assemblies, each of the gauge wheels configured to control the vertical position of the plow as the plow is being pulled through the field.

9. The plow of claim 1, further comprising:
   a hitch affixed to the frame and configured to allow the plow to be lifted and transported by a prime mover.

10. The plow of claim 1, wherein each of the shear assemblies further comprises a stalk manager assembly comprising:
    a stalk manager support extending laterally from the shear support; and
    a deflector positioned parallel to the shear support at a distal end of the stalk manager support,
    wherein the deflector guides vegetation towards the shearing blade as the plow is pulled through the field.

11. A method for fabricating a plow comprising:
    providing a frame comprising a first cross bar and a second cross bar positioned behind the first cross bar in a parallel relationship;
    providing a plurality of support arms that extend from the second cross bar;
    affixing a plurality of shearing assemblies to the first cross bar in a spaced relationship along a length of the first cross bar, wherein each of the shearing assemblies comprises (i) a shear support extending downwardly from the first cross bar, (ii) a shank portion extending at a lateral angle from a distal portion of the shear support, and (iii) a shearing blade attached at a swept back angle in a lateral direction to a distal end of the shank portion;
    affixing a cylinder assembly to the second cross bar in a parallel relationship with the plurality of shearing assemblies, wherein the cylinder assembly is affixed at both ends to the second cross bar and configured to rotate as the plow is pulled through a field, and wherein the cylinder assembly comprises (i) a cylinder body defining a common axis, (ii) a plurality of cylinder blade assemblies laterally positioned along the common axis, each blade assembly positioned immediately behind a respective one of the plurality of shear assemblies and comprising a plurality of cylinder blades radially extending from the cylinder body; and one or more coulters positioned along the common axis and respectively attached to the cylinder body between adjacent cylinder blade assemblies; and affixing a respective rowing device to each of the plurality of support arms, wherein each rowing device is positioned behind the plurality of shear assemblies and the cylinder assembly at a lateral position between adjacent shear assemblies, wherein as the plow is pulled through the field, (i) the shear supports pass between adjacent rows of planted vegetation as the shearing blades operate below the surface of the soil to sever the roots of the planted vegetation, (ii) the plurality cylinder blade assemblies mulch the soil and press the severed vegetation into the soil, (iii) the one or more coulters sever vegetation between adjacent shear assemblies, and (iv) the rowing devices reposition soil on top of the severed vegetation to form furrows and create a seedbed.

12. The method of claim 11, wherein the vertical position of each shearing blade is adjustable.

13. The method of claim 11, wherein providing a plurality of support arms comprises providing a plurality of support arms configured to receive one or more ground working implements.

14. The method of claim 13, wherein the one or more ground working implements are affixed to a respective support arm so as to be laterally adjustable along the length of the support arm.

15. The method of claim 13, wherein the one or more ground working implements are affixed to a respective support arm so as to be vertically adjustable along the length of the support arm.

16. The method of claim 13, wherein each of the plurality of rowing devices is laterally adjustable or vertically adjustable in its attachment to a respective support arm.

17. The method of claim 13, further comprising:
respectively affixing a chisel assembly to each of the plurality of support arms immediately prior to a respective rowing device, wherein each of the chisel assemblies is configured to break the ground between two adjacent rows of planted vegetation.

18. The method of claim 11, wherein affixing a cylinder assembly comprises affixing a cylinder assembly comprising a plurality of gauge wheels laterally positioned along the common axis and respectively attached to the cylinder body between adjacent cylinder assemblies, each of the gauge wheels configured to control the vertical position of the plow as the plow is being pulled through the field.

19. The method of claim 11, further comprising:
affixing a hitch to the frame, wherein the hitch is configured to allow the plow to be lifted and transported by a prime mover.

20. The method of claim 11, further comprising:
affixing a respective stalk manager to each of the shear assemblies, each stalk manager comprising (i) a stalk manager support extending laterally from the shear support and (ii) a deflector positioned parallel to the shear support at a distal end of the stalk manager support,
wherein the deflector guides vegetation towards the shearing blade as the plow is pulled through the field.

* * * * *